US009618728B2

(12) United States Patent
Tomioka

(10) Patent No.: US 9,618,728 B2
(45) Date of Patent: Apr. 11, 2017

(54) MACRO LENS SYSTEM AND IMAGING APPARATUS

(71) Applicant: FUJIFILM Corporation, Tokyo (JP)

(72) Inventor: Ryoko Tomioka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/631,160

(22) Filed: Feb. 25, 2015

(65) Prior Publication Data
US 2015/0247994 A1 Sep. 3, 2015

(30) Foreign Application Priority Data
Feb. 28, 2014 (JP) .................................. 2014-038242

(51) Int. Cl.
*G02B 13/00* (2006.01)
*G02B 9/64* (2006.01)
*G02B 13/24* (2006.01)

(52) U.S. Cl.
CPC ........... *G02B 13/0045* (2013.01); *G02B 9/64* (2013.01); *G02B 13/24* (2013.01)

(58) Field of Classification Search
CPC . G02B 13/24; G02B 9/62; G02B 9/64; G02B 13/0045; G02B 15/14; G02B 15/173
USPC .................. 359/713, 755–758, 676, 683
See application file for complete search history.

(56) References Cited

U.S. PATENT DOCUMENTS

| 2011/0096410 | A1 | 4/2011 | Ryu | |
|---|---|---|---|---|
| 2011/0228160 | A1* | 9/2011 | Imaoka | G02B 15/173 348/345 |
| 2014/0009652 | A1* | 1/2014 | Sugita | G02B 15/22 348/294 |
| 2014/0240554 | A1* | 8/2014 | Uchida | G02B 15/22 348/240.99 |
| 2015/0241658 | A1* | 8/2015 | Tomioka | G02B 9/64 359/684 |

FOREIGN PATENT DOCUMENTS

| JP | 2003-329919 | 11/2003 |
|---|---|---|
| JP | 2011-048232 | 3/2011 |
| JP | 2012-058682 | 3/2012 |

OTHER PUBLICATIONS

Japanese Official Action—2014-038242—Feb. 7, 2017.

* cited by examiner

*Primary Examiner* — Jordan Schwartz
(74) *Attorney, Agent, or Firm* — Young & Thompson

(57) ABSTRACT

A macro lens system includes, in this order from an object side: a positive first lens group; a negative second lens group; a positive third lens group; a negative fourth lens group; a positive fifth lens group; and a negative sixth lens group. The first lens group is constituted by three lenses. The second lens group, the fourth lens group, and the fifth lens group are independently moved in the direction of the optical axes thereof when focusing from an object at infinity to an object at a most proximate distance. The second lens group moves toward the image side and the fourth lens group moves toward the object side when focusing from an object at infinity to an object at a most proximate distance.

18 Claims, 16 Drawing Sheets

FIG.4  EXAMPLE 2

EXAMPLE 3

FIG.8  EXAMPLE 4

FIG.9 EXAMPLE 5

MACRO LENS SYSTEM AND IMAGING APPARATUS

CROSS REFERENCE TO RELATED APPLICATIONS

The present application claims priority under 35 U.S.C. §119 to Japanese Patent Application No. 2014-038242 filed on Feb. 28, 2014. The above application is hereby expressly incorporated by reference in its entirety, into the present application.

TECHNICAL FIELD

The present invention is related to a macro lens system suited for electronic cameras such as digital cameras, video cameras, broadcast cameras, and security cameras, and an imaging apparatus equipped with the macro lens system.

BACKGROUND ART

There are conventional macro lens systems having close distance imaging at imaging magnification ratios of approximately 1× as their main purpose.

These macro lens systems are capable of continuously focusing when imaging an object at infinity to an object at a most proximate distance at which the imaging magnification ratio is approximately 1×. The macro lens systems are particularly designed to obtain high optical performance during imaging of objects at close distances.

Generally, the floating focus method, in which two or more lens groups are moved during focusing operations, is employed in order to suppress variations in aberration accompanying the focusing operations.

Conventionally, the front focusing type of focusing operation, in which the lens group most toward the object side is driven forward, had been utilized. However, in the case that an object at a most proximate distance is imaged, the lens will approach the object, and therefore operability deteriorates. In addition, in the case that a first lens group having a large diameter is moved, high speed focusing becomes difficult because the weight of the first lens group is great. In addition, there was a problem that in the case that close distance imaging at approximately 1× magnification is performed, longitudinal chromatic aberrations become great.

Recently, imaging lenses that adopt the floating focus method, in which a first lens group is fixed and focusing operations are performed by moving a plurality of other lens groups, are being employed. Further, focusing methods that move three or more lens groups in order to further suppress variations in aberration due to focusing operations have been proposed in Japanese Unexamined Patent Publication Nos. 2012-058682 and 2011-048232.

SUMMARY OF THE INVENTION

However, the macro lenses disclosed in Japanese Unexamined Patent Publication No. 2012-058682 and Japanese Unexamined Patent Publication No. 2011-048232 do not sufficiently correct chromatic aberration during photography at close distances, and there is demand for a macro lens having further improved properties.

The object of the present invention is to provide a macro lens system having an imaging magnification of approximately 1× that favorably corrects chromatic aberrations even when imaging at close distances, and an imaging apparatus equipped with the macro lens system.

A macro lens system of the present invention consists essentially of, in this order from an object side:
a first lens group having a positive refractive power;
a second lens group having a negative refractive power;
a third lens group having a positive refractive power;
a fourth lens group having a negative refractive power;
a fifth lens group having a positive refractive power; and
a sixth lens group having a negative refractive power;
further comprising:
a stop which is fixed during focusing operations provided between the surface of the second lens group toward the image side and the surface of the fourth lens group toward the object side; characterized by:
the second lens group, the fourth lens group, and the fifth lens group being independently moved in the direction of the optical axes thereof when focusing from an object at infinity to an object at a most proximate distance; and
the second lens group moving toward the image side and the fourth lens group moving toward the object side when focusing from an object at infinity to an object at a most proximate distance.

In the macro lens system of the present invention, it is preferable for:
the first lens group to have at least one positive lens; and for
at least one positive lens to satisfy Conditional Formulae (1) and (2) below:

$$N1d < 1.65 \tag{1}$$

$$60.0 < v1d \tag{2}$$

wherein $N1d$ denotes the refractive index of the positive lens in the first lens group with respect to the d line, and $v1d$ denotes the Abbe's number of the positive lens in the first lens group with respect to the d line.

In addition, it is preferable for:
the second lens group to have a cemented lens formed by a negative lens and a positive lens, and to satisfy Conditional Formula (3) below:

$$20.0 < v2dn - v2dp \tag{3}$$

wherein $v2dp$ denotes the Abbe's number of the positive lens that forms the cemented lens of the second lens group with respect to the d line, and $v2dn$ denotes the Abbe's number of the negative lens that forms the cemented lens of the second lens group with respect to the d line.

In addition, it is preferable for:
the third lens group to consist essentially of a single positive lens, and to satisfy Conditional Formula (4) below:

$$v3d < 30.0 \tag{4}$$

wherein $v3d$ denotes the Abbe's number of the positive lens of the third lens group with respect to the d line.

In addition, it is preferable for the macro lens system to satisfy Conditional Formula (5) below:

$$0.5 < f3/f < 1.5 \tag{5}$$

wherein f denotes the focal length when focused on an object at infinity, and f3 denotes the focal length of the third lens group.

In addition, it is preferable for the macro lens system to satisfy Conditional Formula (6) below:

$$0.5 < f45/f < 1.5 \tag{6}$$

wherein f45 is the combined focal length of the fourth lens group and the fifth lens group when focused on infinity.

In addition, it is preferable for:
the fourth lens group to have a cemented lens formed by a negative lens and a positive lens, and to satisfy Conditional Formula (7) below:

$$20.0<\nu 4dp-\nu 4dn \quad (7)$$

wherein ν4dp denotes the Abbe's number of the positive lens that forms the cemented lens of the fourth lens group with respect to the d line, and ν4dn denotes the Abbe's number of the negative lens that forms the cemented lens of the fourth lens group with respect to the d line.

In addition, it is preferable for:
at least one surface within the first lens group to be an aspherical surface.

In addition, it is preferable for:
at least one surface within the second lens group to be an aspherical surface.

It is preferable for:
the total number of lenses that constitute the lens groups that move during focusing operations to be 7 or less.

In addition, it is preferable for:
the first lens group to consist essentially of three lenses.

In addition, it is preferable for:
the first lens group to have at least one positive lens; and for
at least one positive lens to satisfy Conditional formulae (1) and (2-1) below:

$$N1d<1.65 \quad (1)$$

$$65.0<\nu 1d \quad (2\text{-}1)$$

In addition, it is preferable for:
the second lens group to have a cemented lens formed by a negative lens and a positive lens, and to satisfy Conditional Formula (3-1) below:

$$25.0<\nu 2dn-\nu 2dp \quad (3\text{-}1)$$

In addition, it is preferable for:
the third lens group to consist essentially of a single positive lens, and to satisfy Conditional Formula (4-1) below:

$$\nu 3d<26.0 \quad (4\text{-}1)$$

It is preferable for:
the macro lens system to satisfy Conditional Formula (5-1) below, and more preferably Conditional Formula (5-2) below:

$$0.6<f3/f<1.2 \quad (5\text{-}1)$$

$$0.65<f3/f<1.0 \quad (5\text{-}2)$$

In addition, it is preferable for:
the macro lens system to satisfy Conditional Formula (6-1) below.

$$0.6<f45/f<1.0 \quad (6\text{-}1)$$

In addition, it is preferable for:
the fourth lens group to have a cemented lens formed by a negative lens and a positive lens, and to satisfy Conditional Formula (7-1) below.

$$25.0<\nu 4dp-\nu 4dn \quad (7\text{-}1)$$

An imaging apparatus of the present invention is characterized by being equipped with the macro lens system of the present invention.

Note that the term "consists essentially of . . . " means that the macro lens system may also include lenses that practically do not have any power, optical elements other than lenses such as a stop, a mask, a glass cover, and a filter, mechanical components such as lens flanges, a lens barrel, an imaging element, and a camera shake correcting mechanism, in addition to the lenses listed above as constituent elements.

In addition, the surface shapes and the signs of the refractive powers of the lenses are considered in the paraxial region in cases that aspherical surfaces are included.

The macro lens system of the present invention consists essentially of, in this order from the object side: the first lens group having a positive refractive power; the second lens group having a negative refractive power; the third lens group having a positive refractive power; the fourth lens group having a negative refractive power; the fifth lens group having a positive refractive power; and the sixth lens group having a negative refractive power; further comprises: the stop which is fixed during focusing operations provided between the surface of the second lens group toward the image side and the surface of the fourth lens group toward the object side; and is characterized by: the second lens group, the fourth lens group, and the fifth lens group being independently moved in the direction of the optical axes thereof when focusing from an object at infinity to an object at a most proximate distance; and the second lens group moving toward the image side and the fourth lens group moving toward the object side when focusing from an object at infinity to an object at a most proximate distance. Therefore, the macro lens system can be that which is capable of favorably correcting chromatic aberrations even when imaging at close distances.

The imaging apparatus of the present invention is equipped with the macro lens system of the present invention. Therefore, the imaging apparatus is capable of obtaining images having high image quality.

DESCRIPTION OF THE PREFERRED EMBODIMENTS

Figure 1:
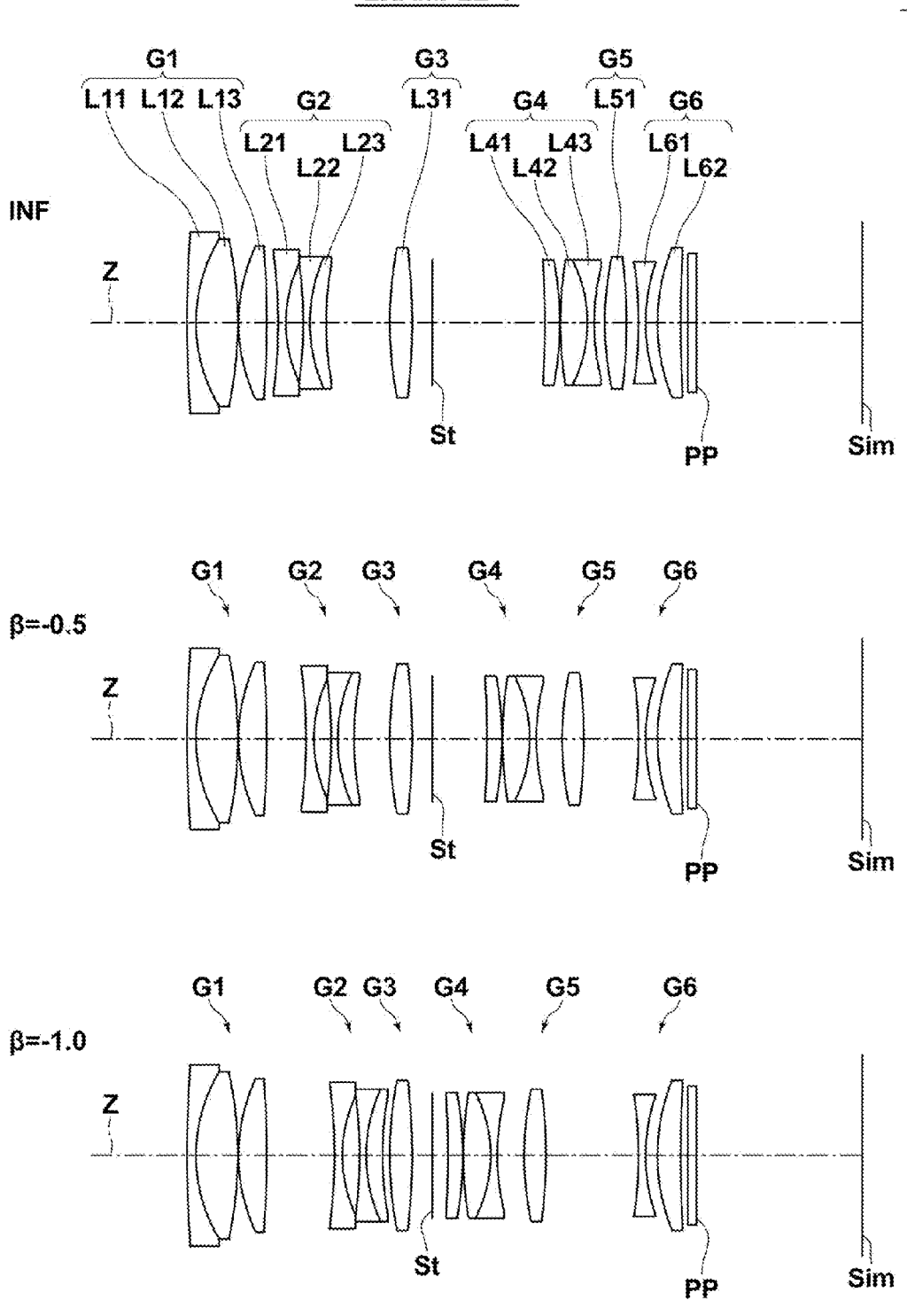
FIG. 1 A collection of sectional diagrams that illustrate the lens configuration of a macro lens system according to a an embodiment of the present invention (corresponding to Example 1)
Figure 2:
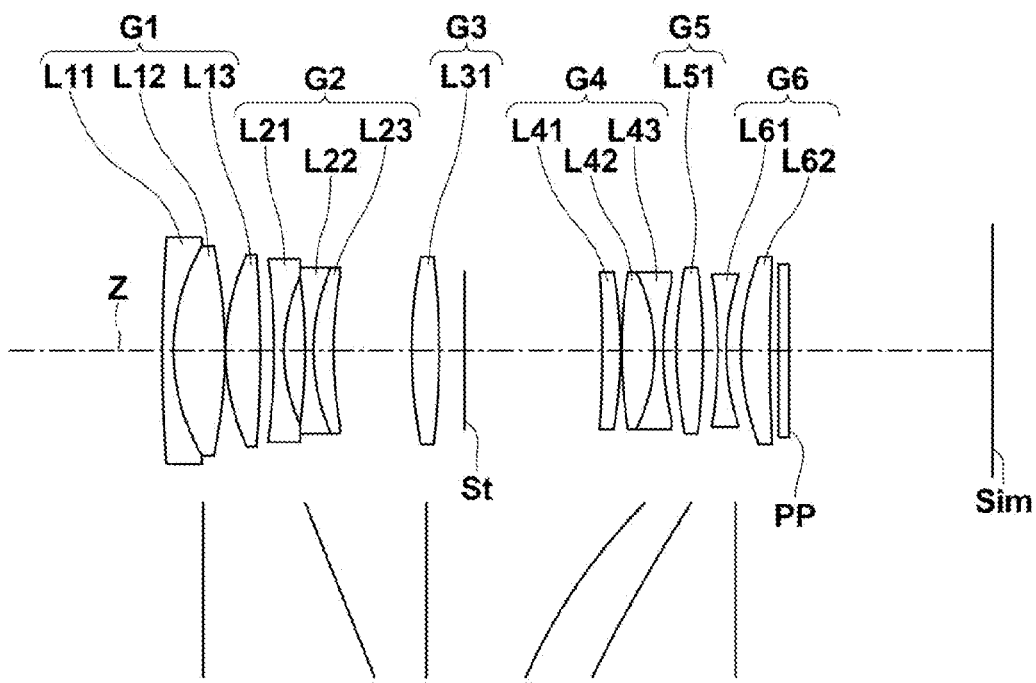
FIG. 2 A diagram that illustrates the movement trajectories of each lens group of the macro lens system according to the embodiment of the present invention (corresponding to Example 1) during a focusing operation FIG. 3 A collection of sectional diagrams that illustrate the lens configuration of a macro lens system according to Example 2 of the present invention FIG. 4 A diagram that illustrates the movement trajectories of each lens group of the macro lens system according to Example 2 of the present invention during a focusing operation FIG. 5 A collection of sectional diagrams that illustrate the lens configuration of a macro lens system according to Example 3 of the present invention FIG. 6 A diagram that illustrates the movement trajectories of each lens group of the macro lens system according to Example 3 of the present invention during a focusing operation FIG. 7 A collection of sectional diagrams that illustrate the lens configuration of a macro lens system according to Example 4 of the present invention FIG. 8 A diagram that illustrates the movement trajectories of each lens group of the macro lens system according to Example 4 of the present invention during a focusing operation FIG. 9 A collection of sectional diagrams that illustrate the lens configuration of a macro lens system according to Example 5 of the present invention FIG. 10 A diagram that illustrates the movement trajectories of each lens group of the macro lens system according to Example 5 of the present invention during a focusing operation FIG. 11 A collection of diagrams that illustrate each type of aberration of the macro lens system of Example 1 of the present invention FIG. 12 A collection of diagrams that illustrate each type of aberration of the macro lens system of Example 2 of the present invention FIG. 13 A collection of diagrams that illustrate each type of aberration of the macro lens system of Example 3 of the present invention FIG. 14 A collection of diagrams that illustrate each type of aberration of the macro lens system of Example 4 of the present invention FIG. 15 A collection of diagrams that illustrate each type of aberration of the macro lens system of Example 5 of the present invention FIGS. 16A and 16B A collection of schematic diagrams that illustrate an imaging apparatus according to an embodiment of the present invention

Hereinafter, embodiments of the present invention will be described in detail with reference to the attached drawings. FIG. 1 is a collection of sectional diagrams that illustrate the lens configuration of a macro lens system according to an embodiment of the present invention, and FIG. 2 is a diagram that illustrates the movement trajectories of each lens group of the macro lens system. The macro lens system illustrated in FIG. 1 and FIG. 2 has the same configuration as a macro lens system of Example 1, to be described later. In FIG. 1 and FIG. 2, the left side is the object side, and the right side is the image side.

As illustrated in FIG. 1 and FIG. 2, the macro lens system has, in this order from the object side along an optical axis Z, a first lens group G1 having a positive refractive power, a second lens group G2 having a negative refractive power, a third lens group G3 having a positive refractive power, an aperture stop St, a fourth lens group G4 having a negative refractive power, a fifth lens group G5 having a positive refractive power, and a sixth lens group G6 having a negative refractive power. The macro lens system is also equipped with an aperture stop St which is fixed during focusing operations provided between the surface of the second lens group G2 toward the image side and the surface of the fourth lens group G4 toward the object side. The macro lens system is configured such that the second lens group G2, the fourth lens group G4, and the fifth lens group G5 move independently along the direction of the optical axes thereof when focusing from an object at infinity to an object at a most proximate distance, and such that the second lens group G2 moves toward the image side and the fourth lens group G4 moves toward the object side when focusing from an object at infinity to an object at a most proximate distance. Note that the aperture stop St in the drawings does not necessary represent the size or shape thereof, but indicates the position of the stop along the optical axis Z.

When the macro lens system is applied to an imaging apparatus, it is preferable for a glass cover, a prism, and various filters such as an infrared ray cutoff filter and a low pass filter to be provided between the optical system and an imaging surface Sim. Therefore, FIG. 1 illustrates an example in which a parallel planar optical member PP is provided between the lens system and the imaging surface Sim, taking the placement of such filters into consideration.

Variations in aberration during focusing operations can be suppressed and favorable image focusing performance can be obtained, by configuring the macro lens system with six groups which are, in this order from the object side, positive, negative, positive, negative, positive, and negative, and by independently moving the second lens group G2, the fourth lens group G4, and the fifth lens group G5 in the direction of the optical axes thereof during focusing operations as described above.

In addition, variations in lateral chromatic aberration in particular can be suppressed, because the second lens group G2 and the fourth lens group G4 move symmetrically with respect to the aperture stop St disposed therebetween.

In addition, it is preferable for the first lens group to have at least one positive lens, and for at least one positive lens to satisfy Conditional Formulae (1) and (2) below. Conditional Formulae (1) and (2) are formulae related to the refractive index and the Abbe's number of the positive lens of the first lens group G1. By the positive lens satisfying Conditional Formulae (1) and (2), it becomes possible to perform well balanced correction of chromatic aberrations during imaging of objects at infinity and during imaging of objects at close distances. Note that more favorable properties can be obtained by the positive lens satisfying Conditional Formulae (1) and (2-1).

$$N1d < 1.65 \tag{1}$$

$$60.0 < \nu 1d \tag{2}$$

$$65.0 < \nu 1d \tag{2-1}$$

wherein N1d denotes the refractive index of the positive lens in the first lens group with respect to the d line, and ν1d denotes the Abbe's number of the positive lens in the first lens group with respect to the d line.

In addition, it is preferable for the second lens group to have a cemented lens formed by a negative lens and a positive lens, and to satisfy Conditional Formula (3) below. Conditional Formula (3) is related to the Abbe's number of the cemented lens in the second lens group G2. By the second lens group satisfying Conditional Formula (3), it becomes possible to perform well balanced correction of chromatic aberrations during imaging of objects at infinity and during imaging of objects at close distances. Note that more favorable properties can be obtained by the second lens group satisfying Conditional Formula (3-1).

$$20.0 < \nu 2dn - \nu 2dp \tag{3}$$

$$25.0 < \nu 2dn - \nu 2dp \tag{3-1}$$

wherein ν2dp denotes the Abbe's number of the positive lens that forms the cemented lens of the second lens group with respect to the d line, and ν2dn denotes the Abbe's number of the negative lens that forms the cemented lens of the second lens group with respect to the d line.

In addition, it is preferable for the third lens group to be constituted by a single positive lens, and to satisfy Conditional Formula (4) below. Conditional Formula (4) is related to the Abbe's number of the positive lens in the third lens group G3. By the third lens group satisfying this conditional formula, it becomes possible to favorably correct longitudinal chromatic aberration. Note that more favorable properties can be obtained by the third lens group satisfying Conditional Formula (4-1).

$$v3d<30.0 \tag{4}$$

$$v3d<26.0 \tag{4-1}$$

wherein v3d denotes the Abbe's number of the positive lens of the third lens group with respect to the d line.

In addition, it is preferable for the macro lens system to satisfy Conditional Formula (5) below. Conditional Formula (5) is related to the power of the third lens group G3. The power of the third lens group G3 can be prevented from becoming too strong, and spherical aberrations can be favorably corrected, by the value of f3/f not being less than the lower limit of Conditional Formula (5). In addition, the power of the third lens group G3 can be prevented from becoming too weak, and the outer diameters of the moving lens groups can be kept small, which results in weight reduction and high speed focusing operations, by the value of f3/f not exceeding the upper limit of Conditional Formula (5). Note that more favorable properties can be obtained by satisfying Conditional Formula (5-1), and more preferably Conditional Formula (5-2) below.

$$0.5<f3/f<1.5 \tag{5}$$

$$0.6<f3/f<1.2 \tag{5-1}$$

$$0.65<f3/f<1.0 \tag{5-2}$$

wherein f denotes the focal length when focused on an object at infinity, and f3 denotes the focal length of the third lens group.

In addition, it is preferable for the macro lens system to satisfy Conditional Formula (6) below. Conditional Formula (6) is related to the combined power of the fourth lens group G4 and the fifth lens group G5. The power of the fourth lens group G4 can be prevented from becoming too strong, and variation in aberrations due to focusing operations can be suppressed, by the value of f45/f not being less than the lower limit of Conditional Formula (6). In addition, the amount of movement during focusing operations can be reduced, which results in the total length of the lens system being prevented from becoming large, by the power of the value of f45/f not exceeding the upper limit of Conditional Formula (6). Note that more favorable properties can be obtained by satisfying Conditional Formula (6-1)

$$0.5<f45/f<1.5 \tag{6}$$

$$0.6<f45/f<1.0 \tag{6-1}$$

wherein f denotes the focal length when focused on an object at infinity, and f45 denotes the combined focal length of the fourth lens group and the fifth lens group when focused on infinity.

In addition, it is preferable for the fourth lens group to have a cemented lens formed by a negative lens and a positive lens, and to satisfy Conditional Formula (7) below. Conditional Formula (7) is related to the Abbe's numbers of the lenses that form the cemented lens in the fourth lens group G4. Longitudinal chromatic aberrations can be favorably corrected from imaging an object at infinity to imaging an object at a most proximate distance, by the Abbe's numbers of the lenses satisfying Conditional Formula (7). Note that more favorable properties can be obtained by the Abbe's numbers satisfying Conditional Formula (7-1).

$$20.0<v4dp-v4dn \tag{7}$$

$$25.0<v4dp-v4dn \tag{7-1}$$

wherein v4dp denotes the Abbe's number of the positive lens that forms the cemented lens of the fourth lens group with respect to the d line, and v4dn denotes the Abbe's number of the negative lens that forms the cemented lens of the fourth lens group with respect to the d line.

In addition, favorable correction of aberrations will become possible without increasing the number of lenses by forming at least one surface within the first lens group G1 and within second lens group G2 to be aspherical, which contributes to miniaturization and weight reduction of the imaging lens system.

It is preferable for the total number of lenses that constitute the lens groups that move during focusing operations to be 7 or less. Thereby, the weight of the moving lenses can be reduced, contributing to high speed focusing operations.

In addition, by forming the first lens group G1 with three lenses, the number of lenses having large outer diameters can be suppressed in the first lens group G1, which contributes to miniaturization, cost reduction, and weight reduction.

In the present macro lens system, a specific preferred material to be placed most toward the object side is glass. Alternatively, a transparent ceramic material may be employed.

In addition, in the case that the present macro lens system is to be utilized in a severe environment, it is preferable for a protective multilayer film coating to be provided. Further, an antireflection coating may be administered in addition to the protective coating, in order to reduce ghost light and the like during use.

In the example illustrated in FIG. 1, the optical member PP is provided between the lens system and the imaging surface Sim. Alternatively, various filters, such as a low pass filter or filters that cut off specific wavelength bands, may be provided among the lenses instead of being provided between the lens system and the imaging surface Sim. As a further alternative, coatings that have the same functions as the various filters may be administered on the surfaces of the lenses.

Next, the numerical values of Examples of the macro lens system of the present invention will be described.

First, the macro lens system of Example 1 will be described. FIG. 1 is a collection of sectional diagrams that illustrate the lens configuration of the macro lens system of Example 1, and FIG. 2 is a diagram that illustrates the movement trajectories of each lens group of the macro lens system of Example 1. Note that the optical member PP is illustrated in FIGS. 1 and 2, as well as FIGS. 3 through 10 that correspond to Examples 2 through 5 to be described later. In these drawings, the left side is the object side, the right side is the image side, and the aperture stops St illustrated therein do not necessary represent the size or shape thereof, but indicate the positions of the stops along the optical axis Z.

Basic lens data of the macro lens system of Example 1 are shown in Table 1, data related to various factors are shown in Table 2, data related to distances among the moving surfaces are shown in Table 3, and data related to aspherical coefficients are shown in Table 4. Hereinafter, the symbols within the tables will be described with reference to those related to Example 1. The same basically applies to tables related to Examples 2 through 5 as well.

In the lens data of Table 1, surface numbers i (i=1, 2, 3, . . . ) that sequentially increase with the surface of the constituent element most toward the object side being designated as 1 are listed in column Si; the radii of curvature of $i^{th}$ surfaces are listed in column Ri; and distances between an $i^{th}$ surface and an $i+1^{st}$ surface are listed in column Di. In addition, refractive indices with respect to the d line (wavelength: 587.6 nm) of optical elements j (j=1, 2, 3, . . . ) that sequentially increase with the optical element most toward the object side being designated as 1 are listed in column Ndj; and the Abbe's numbers with respect to the d line (wavelength: 587.6 nm) of $j^{th}$ optical elements are listed in column νdj.

Note that the signs of the radii of curvature are positive in cases that the shapes of the surfaces are convex toward the object side, and negative in cases that the shapes of the surfaces are concave toward the object side. The basic lens data also include data regarding the aperture stop St and the optical member PP. The word (stop) is indicated along with the surface number in the row corresponding to the aperture stop St of column Si. In addition, DD[i] is indicated in the rows corresponding to surface distances that change when changing magnification of column Di. In addition, the value in the lowermost row of column Di indicates the distance between the image side surface of the optical member PP and the imaging surface Sim.

Focal lengths f', back focus values Bf', F value F Nos. and full angles of view 2ω for a state when imaging an object at infinity, a state when imaging an object at an intermediate distance, and a state when imaging an object at a most proximate distance are listed as the data related to factors in Table 2.

In the basic lens data, the data related to the factors, and the data related to the distances among the moving surfaces, degrees are employed as the unit of angles, and mm is employed as the unit of length. However, because optical systems may be proportionately enlarged or reduced and utilized, other appropriate units may be employed.

In the lens data of Table 1, the mark "*" is added to surface numbers corresponding to aspherical surfaces, and numerical values of paraxial radii of curvature are listed as the radii of curvature of the aspherical surfaces. The surface numbers Si of the aspherical surfaces and aspherical coefficients related to the aspherical surfaces are listed in Table 4 as the data related to aspherical coefficients. The aspherical coefficients are the values of coefficients KA, A, and Am (m=3, 4, 5, . . . , 20) in aspherical formula (A) below.

$$Zd = C \cdot h^2 / \{1 + (1 - KA \cdot C^2 \cdot h^2)^{1/2}\} + \Sigma Am \cdot h^m \quad (A)$$

wherein Zd represents the depth of the aspherical surface (the length of a line drawn from a point of the aspherical surface having a height h to a plane perpendicular to the optical axis that contacts the peak of the aspherical surface), h represents the height (the distance from the optical axis), C represents the reciprocal of the paraxial radius of curvature, and KA and Am represent aspherical coefficients (m=3, 4, 5, . . . , 20).

TABLE 1

Example 1: Lens Data

| Si (Surface Number) | Ri (Radius of Curvature) | Di (Distance) | Ndj (Refractive Index) | νdj (Abbe's Number) |
|---|---|---|---|---|
| 1 | 182.1189 | 1.25 | 1.80809 | 22.76 |
| 2 | 23.5133 | 5.91 | 1.49700 | 81.54 |
| 3 | −58.0868 | 0.10 | | |
| *4 | 25.4930 | 4.00 | 1.80139 | 45.45 |
| 5 | −145.8843 | DD[5] | | |
| 6 | −77.6983 | 1.10 | 1.83441 | 37.28 |
| *7 | 20.0000 | 2.44 | | |
| 8 | −65.9381 | 0.94 | 1.51680 | 64.20 |
| 9 | 23.2572 | 2.30 | 2.00272 | 19.32 |

TABLE 1-continued

Example 1: Lens Data

| Si (Surface Number) | Ri (Radius of Curvature) | Di (Distance) | Ndj (Refractive Index) | νdj (Abbe's Number) |
|---|---|---|---|---|
| 10 | 47.9624 | DD[10] | | |
| 11 | 57.1170 | 3.15 | 2.00069 | 25.46 |
| 12 | −96.5771 | 2.87 | | |
| 13 (stop) | ∞ | DD[13] | | |
| 14 | −146.7867 | 2.10 | 2.00100 | 29.13 |
| 15 | −50.5656 | 0.10 | | |
| 16 | 56.0377 | 3.83 | 1.72916 | 54.68 |
| 17 | −20.0128 | 0.95 | 1.84666 | 23.78 |
| 18 | 33.3059 | DD[18] | | |
| 19 | 46.0122 | 3.07 | 2.00100 | 29.13 |
| 20 | −76.7327 | DD[20] | | |
| 21 | −58.4742 | 1.00 | 1.90366 | 31.32 |
| 22 | 26.8039 | 1.67 | | |
| 23 | 29.1424 | 3.30 | 1.77250 | 49.60 |
| 24 | 227.3277 | 1.00 | | |
| 25 | ∞ | 1.22 | 1.51680 | 64.20 |
| 26 | ∞ | 23.39 | | |

TABLE 2

Example 1: Items (related to the d line)

| | β = 0 | β = −0.5 | β = −0.97 |
|---|---|---|---|
| f' | 49.81 | | |
| Bf' | 25.19 | | |
| FNo. | 2.87 | 3.30 | 3.84 |
| 2ω[°] | 32.2 | 23.0 | 16.4 |

TABLE 3

Example 1: Distances Among Lens Groups

| DD[5] | 1.60 | 5.56 | 9.57 |
|---|---|---|---|
| DD[10] | 9.00 | 5.04 | 1.03 |
| DD[13] | 15.88 | 7.72 | 2.19 |
| DD[18] | 1.50 | 3.63 | 3.80 |
| DD[20] | 1.70 | 7.74 | 13.09 |

TABLE 4

Example 1: Aspherical Surface Coefficients

| Surface Number | 4 |
|---|---|
| KA | 1.2223430E+00 |
| A3 | −3.6035405E−05 |
| A4 | 8.7742647E−06 |
| A5 | −3.1504332E−06 |
| A6 | 3.0714624E−07 |
| A7 | −1.6353093E−09 |
| A8 | −1.7391527E−09 |
| A9 | −3.2922576E−11 |
| A10 | 1.9638437E−12 |
| A11 | 3.0961977E−12 |
| A12 | −4.6419074E−14 |
| A13 | −3.1708403E−14 |
| A14 | −1.8644455E−15 |
| A15 | 5.6612429E−16 |
| A16 | −2.3833709E−17 |

| Surface Number | 7 |
|---|---|
| KA | 5.7694954E−01 |
| A3 | −7.2961393E−05 |
| A4 | 3.1230355E−05 |
| A5 | −6.5467676E−06 |

TABLE 4-continued

Example 1: Aspherical Surface Coefficients

| | |
|---|---|
| A6 | 4.0588512E−07 |
| A7 | 4.1153931E−08 |
| A8 | −5.5366383E−09 |
| A9 | 1.4942900E−10 |
| A10 | −8.4960165E−11 |
| A11 | 1.5208835E−11 |
| A12 | −7.0633849E−13 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Figure 11:
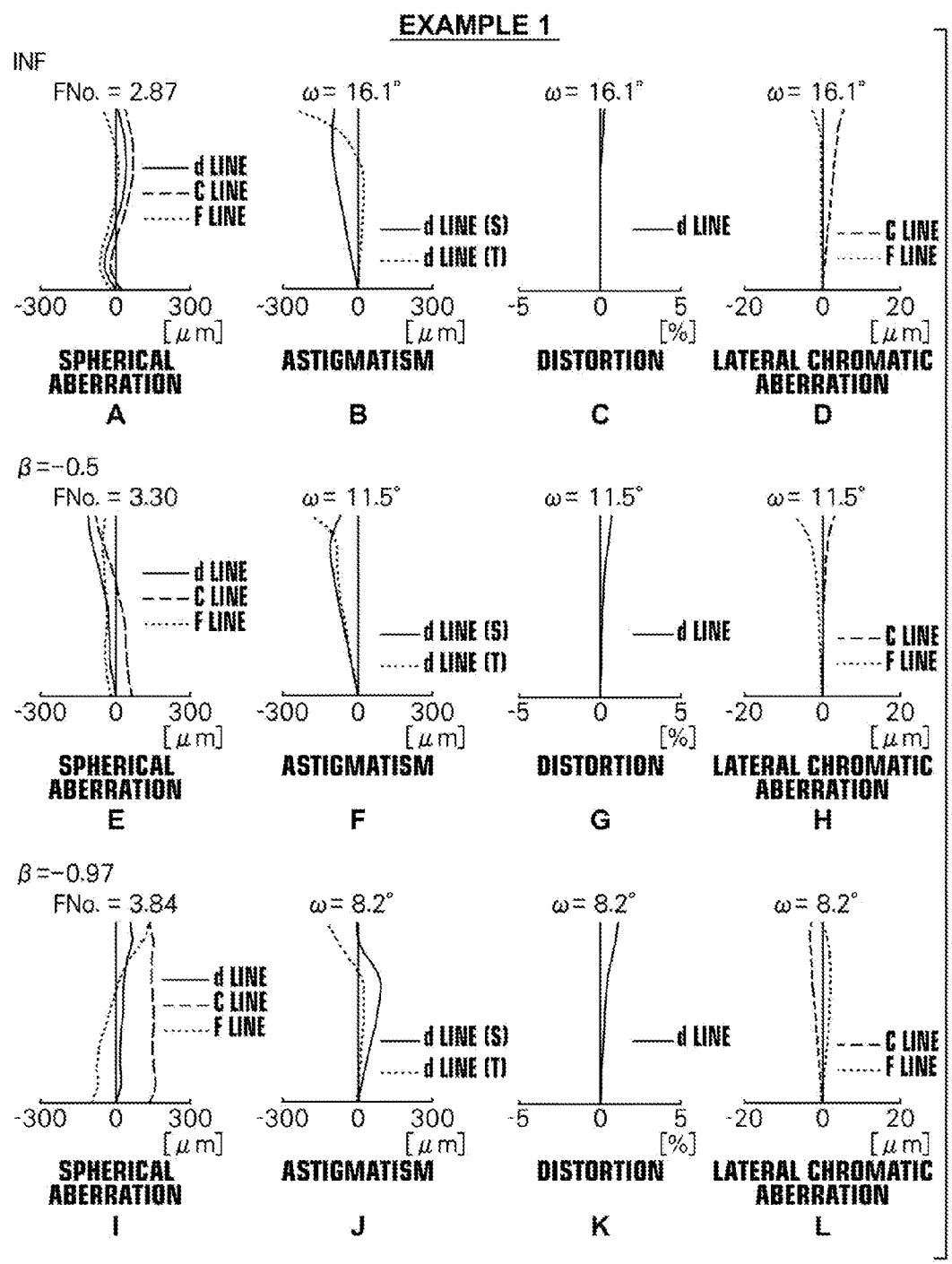

A through L of FIG. 11 are diagrams that illustrate each type of aberration of the macro lens system of Example 1. A through D of FIG. 11 respectively illustrate spherical aberration, astigmatism, distortion, and lateral chromatic aberration in a state when imaging an object at infinity. E through H of FIG. 11 respectively illustrate spherical aberration, astigmatism, distortion, and lateral chromatic aberration in a state when imaging an object at an intermediate distance. I through L of FIG. 11 respectively illustrate spherical aberration, astigmatism, distortion, and lateral chromatic aberration in a state when imaging an object at a most proximate distance.

Aberrations having the d line (wavelength: 587.6 nm) as a reference wavelength are illustrated in the diagrams that illustrate spherical aberration, astigmatism, and distortions related to the d line (wavelength: 587.6 nm), the C line (wavelength: 656.3 nm), and the F line (wavelength: 486.1 nm) are respectively denoted by solid lines, broken lines, and dotted lines in the diagrams that illustrate spherical aberration. Aberrations in the sagittal direction and the tangential direction are respectively denoted by solid lines and dotted lines in the diagrams that illustrate astigmatism. Aberrations related to the C line (wavelength: 656.3 nm) and the F line (wavelength: 486.1 nm) are respectively denoted by broken lines and dotted lines in the diagrams that illustrate lateral chromatic aberration. Note that "Fno." denotes F values in the diagrams that illustrate spherical aberrations, and w denotes half angles of view in the diagrams that illustrate other types of aberrations.

Figure 3:
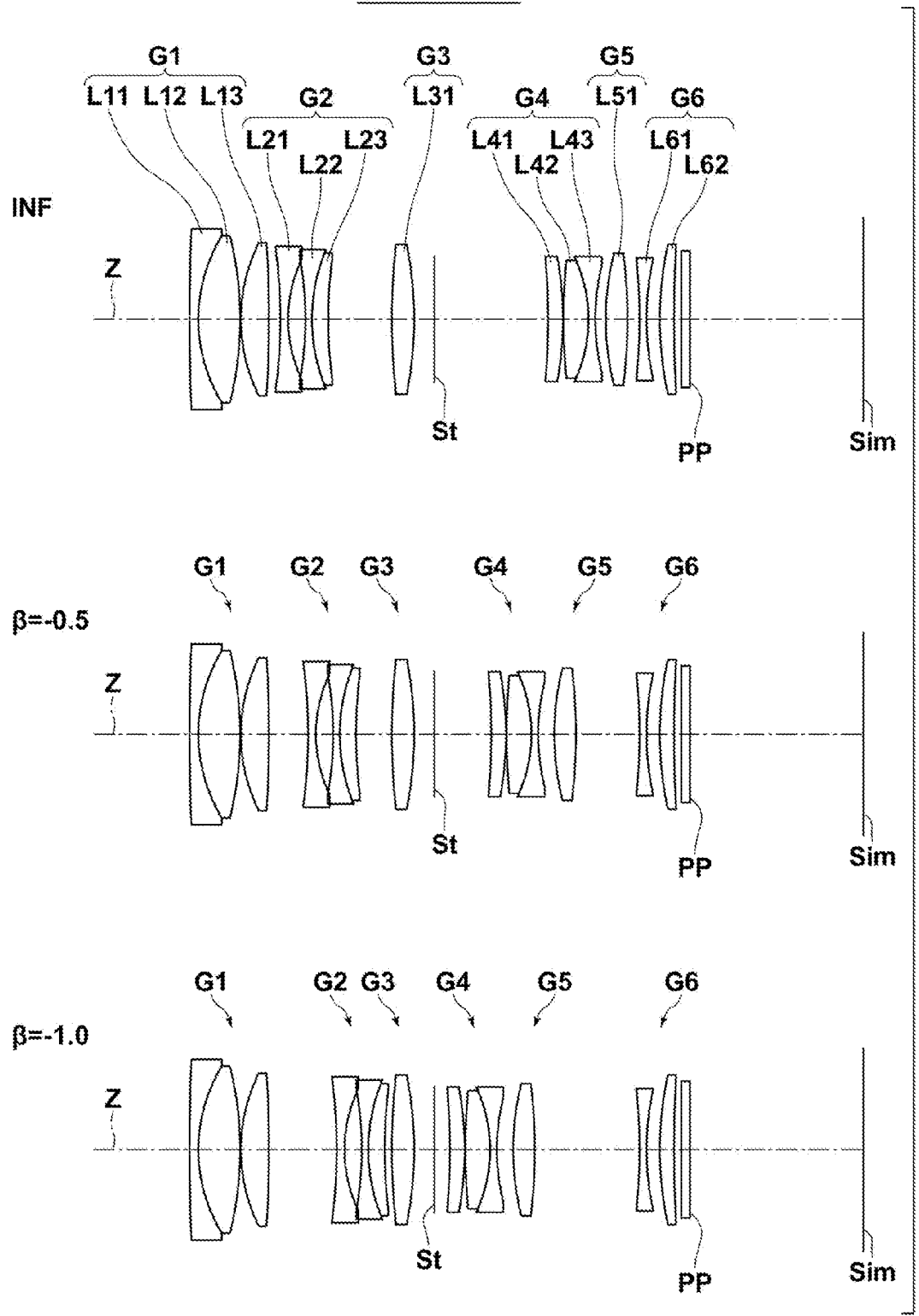
Figure 4:
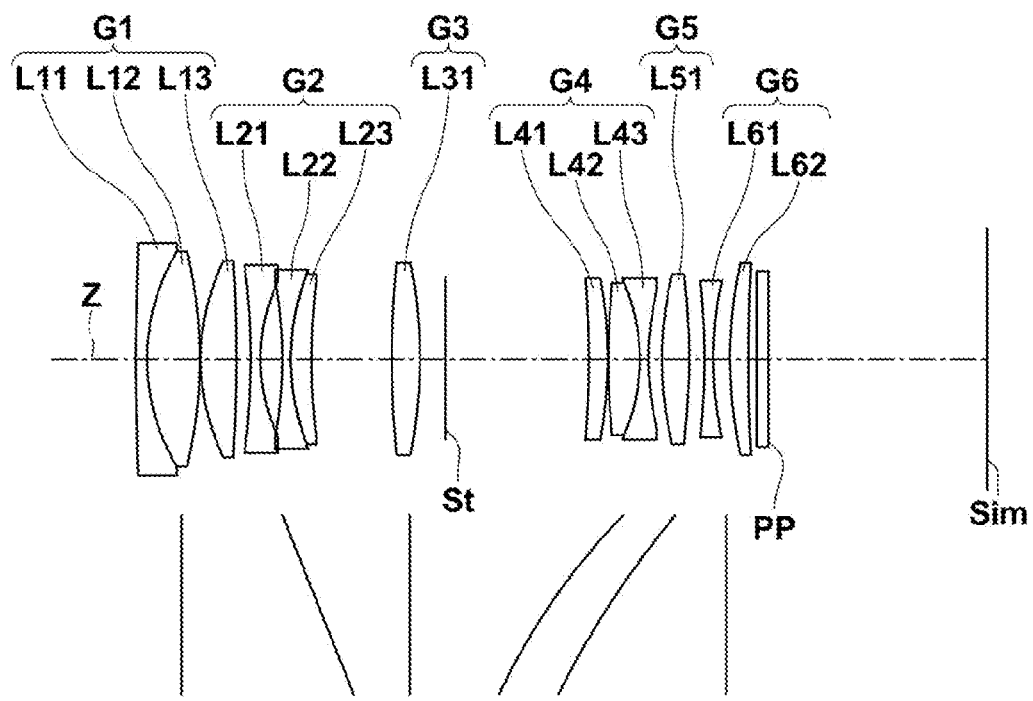
Figure 12:
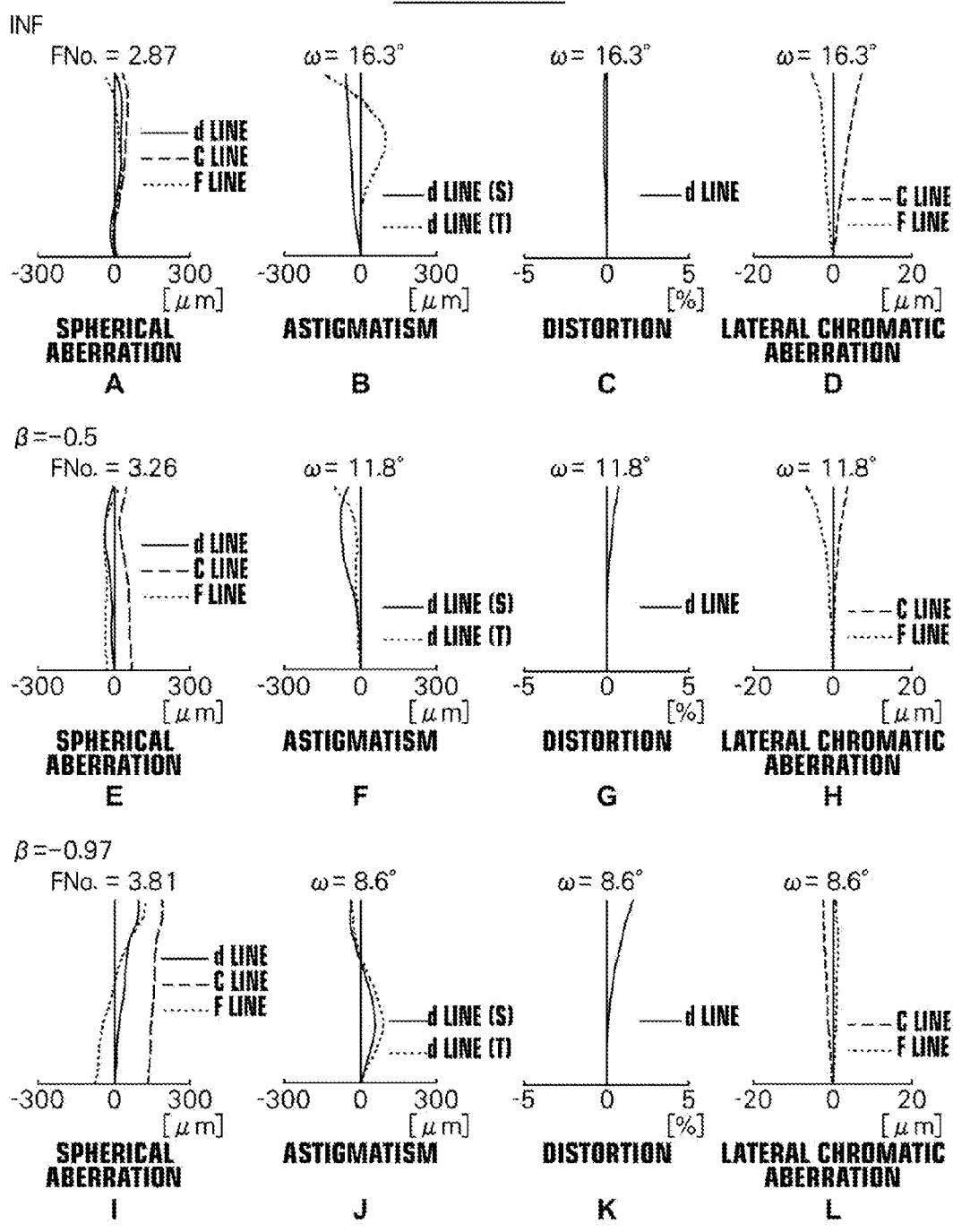

Next, a macro lens system of Example 2 will be described. FIG. 3 is a collection of sectional diagrams that illustrate the lens configuration of the macro lens system of Example 2, and FIG. 4 is a diagram that illustrates the movement trajectories of each lens group of the macro lens system of Example 2. Basic lens data of the macro lens system of Example 2 are shown in Table 5, data related to various factors are shown in Table 6, data related to distances among the moving surfaces are shown in Table 7, and data related to aspherical coefficients are shown in Table 8. A through L of FIG. 12 are diagrams that illustrate each type of aberration of the macro lens system of Example 2.

TABLE 5

Example 2: Lens Data

| Si (Surface Number) | Ri (Radius of Curvature) | Di (Distance) | Ndj (Refractive Index) | vdj (Abbe's Number) |
|---|---|---|---|---|
| 1 | 319.8036 | 1.26 | 1.80809 | 22.76 |
| 2 | 23.3772 | 5.90 | 1.49700 | 81.54 |
| 3 | −51.1372 | 0.10 | | |
| *4 | 24.4472 | 4.00 | 1.80139 | 45.45 |
| 5 | −174.0567 | DD[5] | | |
| 6 | −77.7001 | 1.10 | 1.83441 | 37.28 |
| *7 | 20.0000 | 2.44 | | |
| 8 | −49.7917 | 0.94 | 1.51680 | 64.20 |
| 9 | 26.1729 | 2.30 | 2.00272 | 19.32 |
| 10 | 68.7991 | DD[10] | | |
| 11 | 99.5677 | 3.15 | 2.00069 | 25.46 |
| 12 | −55.5067 | 2.87 | | |
| 13 (stop) | ∞ | DD[13] | | |
| 14 | −105.5167 | 2.10 | 2.00100 | 29.13 |
| 15 | −49.7055 | 0.10 | | |
| 16 | 93.5226 | 3.51 | 1.72916 | 54.68 |
| 17 | −21.3233 | 0.95 | 1.84666 | 23.78 |
| 18 | 31.9888 | DD[18] | | |
| 19 | 39.7142 | 3.07 | 2.00100 | 29.13 |
| 20 | −77.2366 | DD[20] | | |
| 21 | −84.7104 | 1.00 | 1.92286 | 20.88 |
| 22 | 40.9693 | 1.87 | | |
| 23 | 50.6481 | 2.02 | 1.84666 | 23.78 |
| 24 | 200.0001 | 1.00 | | |
| 25 | ∞ | 1.22 | 1.51680 | 64.20 |
| 26 | ∞ | 24.54 | | |

TABLE 6

Example 2: Items (related to the d line)

| | β = 0 | β = −0.5 | β = −0.97 |
|---|---|---|---|
| f | 49.86 | | |
| Bf | 26.35 | | |
| FNo. | 2.87 | 3.26 | 3.81 |
| 2ω[°] | 32.6 | 23.6 | 17.2 |

TABLE 7

Example 2: Distances Among Lens Groups

| | | | |
|---|---|---|---|
| DD[5] | 1.60 | 5.52 | 9.57 |
| DD[10] | 9.00 | 5.08 | 1.03 |
| DD[13] | 16.09 | 8.02 | 2.18 |
| DD[18] | 1.50 | 2.28 | 2.29 |
| DD[20] | 1.70 | 8.99 | 14.81 |

TABLE 8

Example 2: Aspherical Surface Coefficients

| Surface Number | 4 |
|---|---|
| KA | 6.2713275E−01 |
| A3 | −1.3100965E−05 |
| A4 | 2.9799344E−06 |
| A5 | −6.4803649E−07 |
| A6 | 3.0015874E−08 |
| A7 | 1.6641095E−09 |
| A8 | −9.7963045E−11 |
| A9 | −6.3898804E−12 |
| A10 | −2.2118781E−13 |
| A11 | −1.4908567E−14 |
| A12 | 1.4562963E−14 |
| A13 | −1.3443413E−15 |
| A14 | −9.6920440E−17 |

TABLE 8-continued

Example 2: Aspherical Surface Coefficients

| | |
|---|---|
| A15 | 2.6235676E−17 |
| A16 | −1.2303149E−18 |

| Surface Number | 7 |
|---|---|
| KA | 8.1422423E−01 |
| A3 | −2.8440507E−05 |
| A4 | 6.6484074E−06 |
| A5 | −1.7128775E−06 |
| A6 | −3.6189030E−09 |
| A7 | 1.0461020E−08 |
| A8 | 5.5471006E−10 |
| A9 | −3.8544674E−11 |
| A10 | −9.0018810E−12 |
| A11 | −7.4316217E−13 |
| A12 | 1.1154343E−13 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Figure 5:
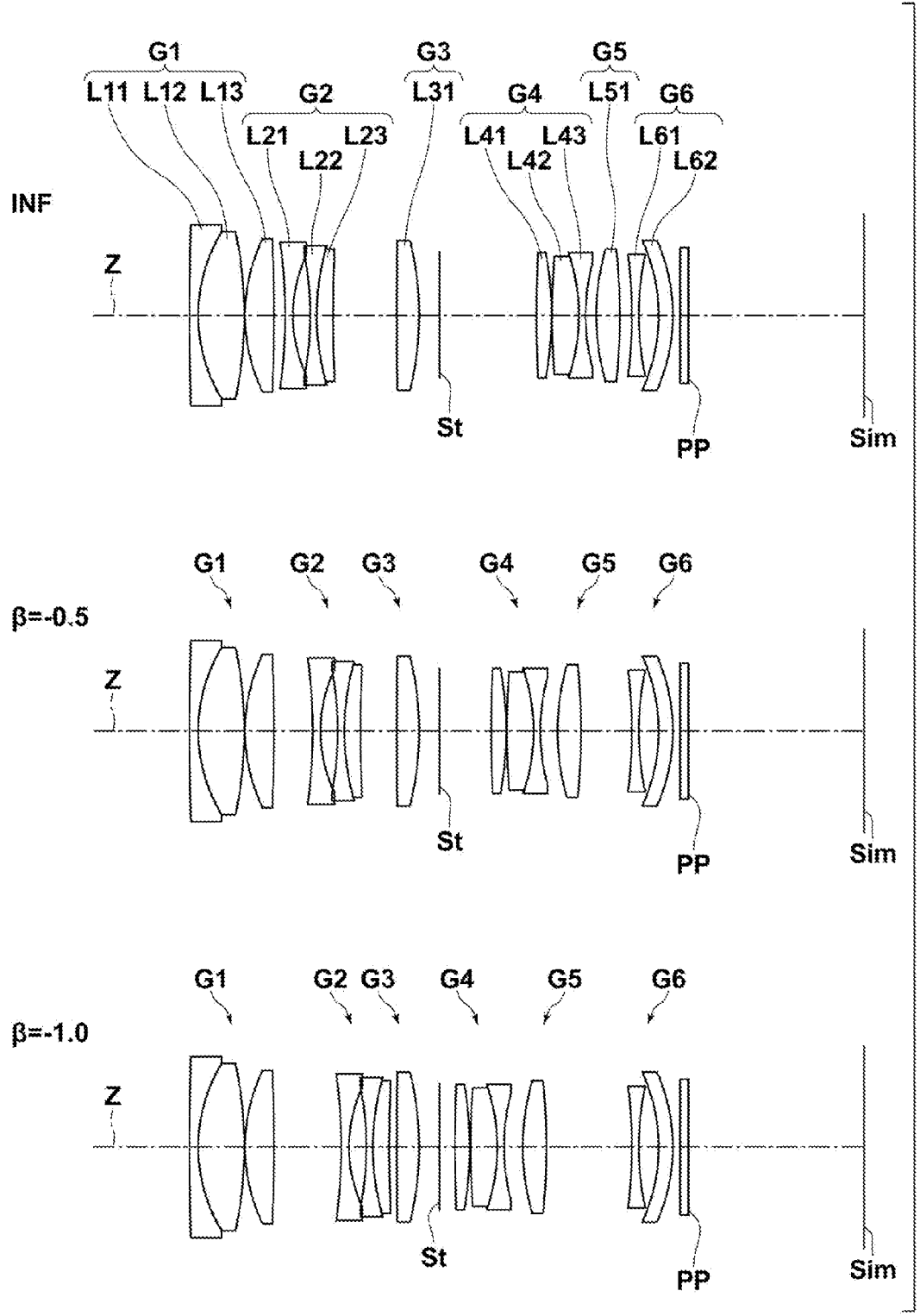
Figure 6:
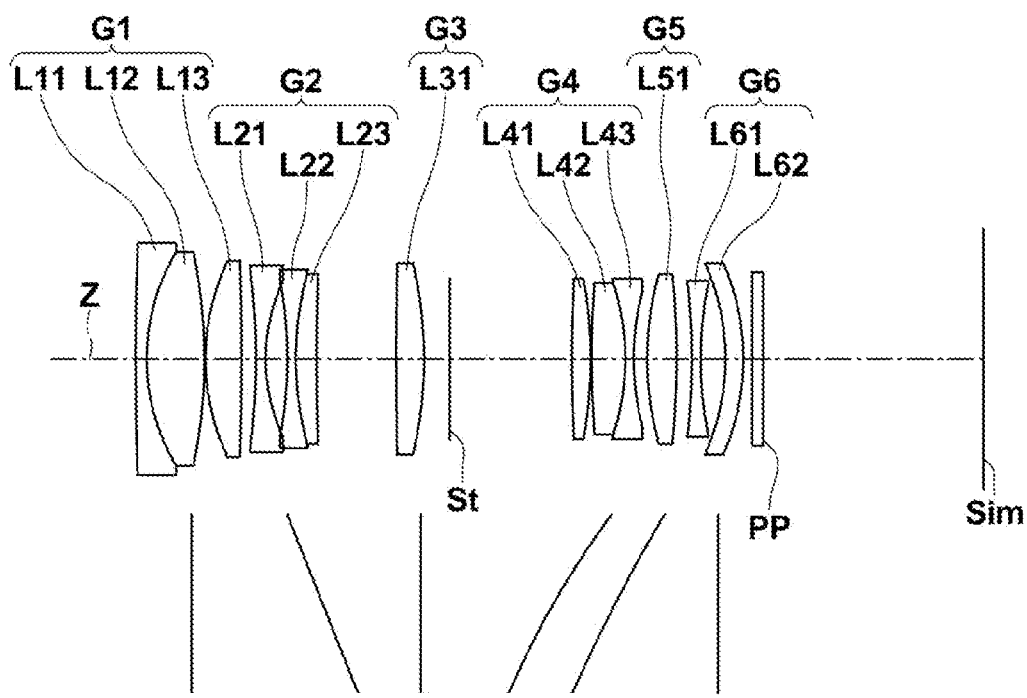
Figure 13:
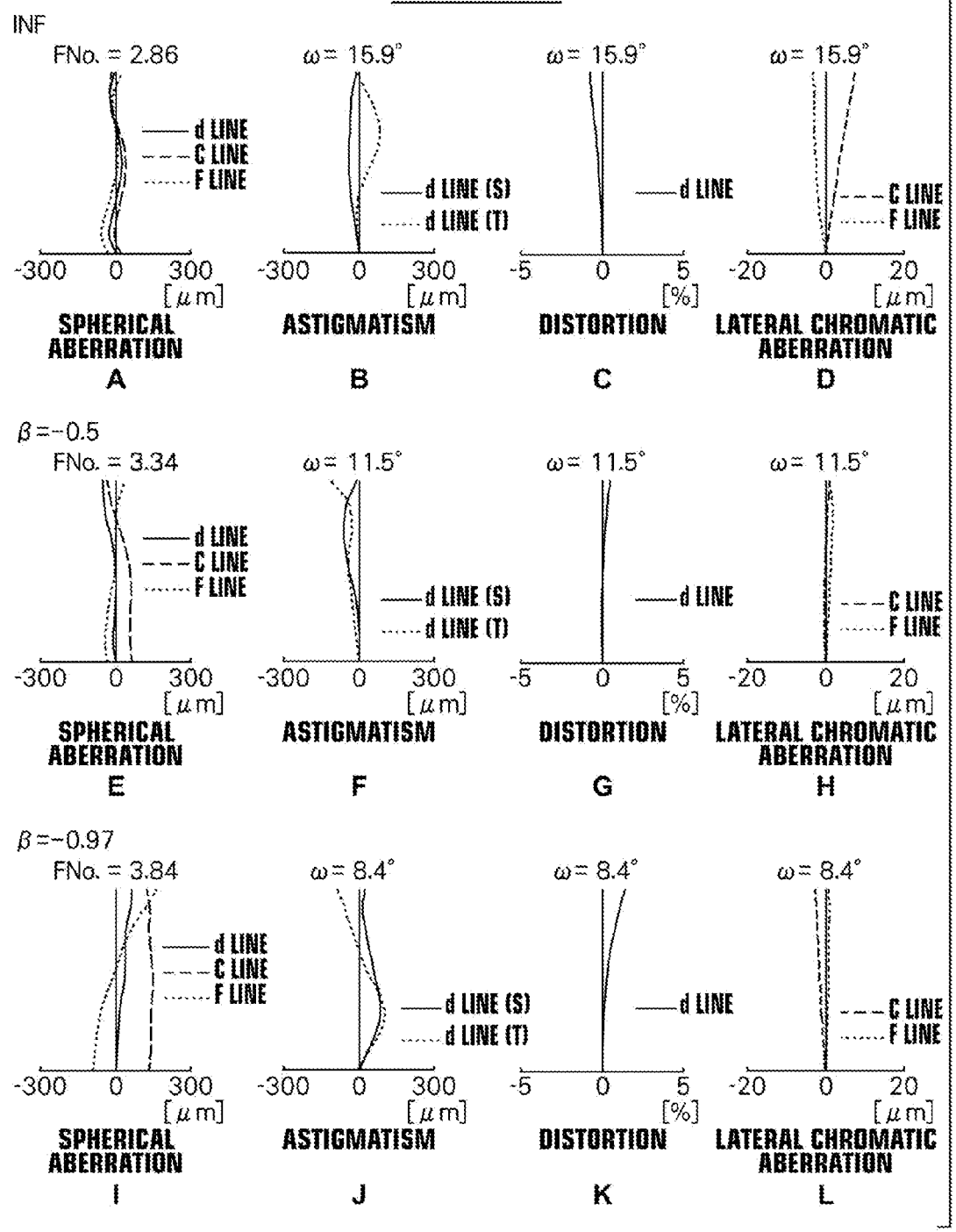

Next, a macro lens system of Example 3 will be described. FIG. 5 is a collection of sectional diagrams that illustrate the lens configuration of the macro lens system of Example 3, and FIG. 6 is a diagram that illustrates the movement trajectories of each lens group of the macro lens system of Example 3. Basic lens data of the macro lens system of Example 3 are shown in Table 9, data related to various factors are shown in Table 10, data related to distances among the moving surfaces are shown in Table 11, and data related to aspherical coefficients are shown in Table 12. A through L of FIG. 13 are diagrams that illustrate each type of aberration of the macro lens system of Example 3.

TABLE 9

Example 3: Lens Data

| Si (Surface Number) | Ri (Radius of Curvature) | Di (Distance) | Ndj (Refractive Index) | vdj (Abbe's Number) |
|---|---|---|---|---|
| 1 | 375.2254 | 1.26 | 1.84666 | 23.78 |
| 2 | 23.3466 | 6.50 | 1.59522 | 67.74 |
| 3 | −59.0220 | 0.10 | | |
| *4 | 24.8839 | 4.08 | 1.80139 | 45.45 |
| 5 | −326.0736 | DD[5] | | |
| 6 | −78.7848 | 1.10 | 1.80610 | 40.73 |
| *7 | 20.0000 | 2.44 | | |
| 8 | −47.5574 | 0.94 | 1.51742 | 52.43 |
| 9 | 36.2908 | 2.30 | 1.95906 | 17.47 |
| 10 | 203.5816 | DD[10] | | |
| 11 | 799.6875 | 3.15 | 1.92286 | 20.88 |
| 12 | −45.9662 | 2.87 | | |
| 13 (stop) | ∞ | DD[13] | | |
| 14 | 213.1091 | 2.10 | 1.69680 | 55.53 |
| 15 | −50.7251 | 0.10 | | |
| 16 | 112.3316 | 3.78 | 1.72916 | 54.68 |
| 17 | −27.6530 | 0.95 | 1.80809 | 22.76 |
| 18 | 29.9784 | DD[18] | | |
| 19 | 35.0475 | 3.32 | 1.91082 | 35.25 |
| 20 | −95.5100 | DD[20] | | |
| 21 | −74.9946 | 1.00 | 1.62588 | 35.70 |
| 22 | 42.5944 | 2.80 | | |
| 23 | −26.0464 | 2.00 | 1.54814 | 45.79 |
| 24 | −27.0200 | 1.00 | | |
| 25 | ∞ | 1.22 | 1.51680 | 64.20 |
| 26 | ∞ | 24.78 | | |

TABLE 10

Example 3: Items (related to the d line)

| | β = 0 | β = −0.5 | β = −0.97 |
|---|---|---|---|
| f' | 51.52 | | |
| Bf' | 26.58 | | |
| FNo. | 2.86 | | |
| 2ω[°] | 31.8 | 23.0 | 16.8 |

TABLE 11

Example 3: Distances Among Lens Groups

| | | | |
|---|---|---|---|
| DD[5] | 1.60 | 5.49 | 9.53 |
| DD[10] | 9.00 | 5.11 | 1.07 |
| DD[13] | 13.74 | 7.34 | 2.21 |
| DD[18] | 1.50 | 2.44 | 2.67 |
| DD[20] | 1.70 | 7.17 | 12.07 |

TABLE 12

Example 3: Aspherical Surface Coefficients

| Surface Number | 4 |
|---|---|
| KA | 3.7178373E−01 |
| A3 | −1.7637048E−05 |
| A4 | 6.5167860E−06 |
| A5 | −8.1435000E−07 |
| A6 | 3.0593328E−08 |
| A7 | 1.6007133E−09 |
| A8 | −1.3524488E−11 |
| A9 | 9.9873108E−12 |
| A10 | −1.1358488E−14 |
| A11 | −2.4655584E−13 |
| A12 | −7.3640883E−15 |
| A13 | −2.0534193E−15 |
| A14 | 1.6500754E−16 |
| A15 | 7.2270563E−17 |
| A16 | −5.2359779E−18 |

| Surface Number | 7 |
|---|---|
| KA | 8.2109126E−01 |
| A3 | −4.2940231E−05 |
| A4 | 1.1385319E−05 |
| A5 | −3.6643862E−06 |
| A6 | 1.2945255E−07 |
| A7 | 2.7952458E−08 |
| A8 | −1.4141157E−09 |
| A9 | −2.9480815E−10 |
| A10 | −1.0116810E−11 |
| A11 | 6.5937178E−12 |
| A12 | −3.5391243E−13 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Figure 7:
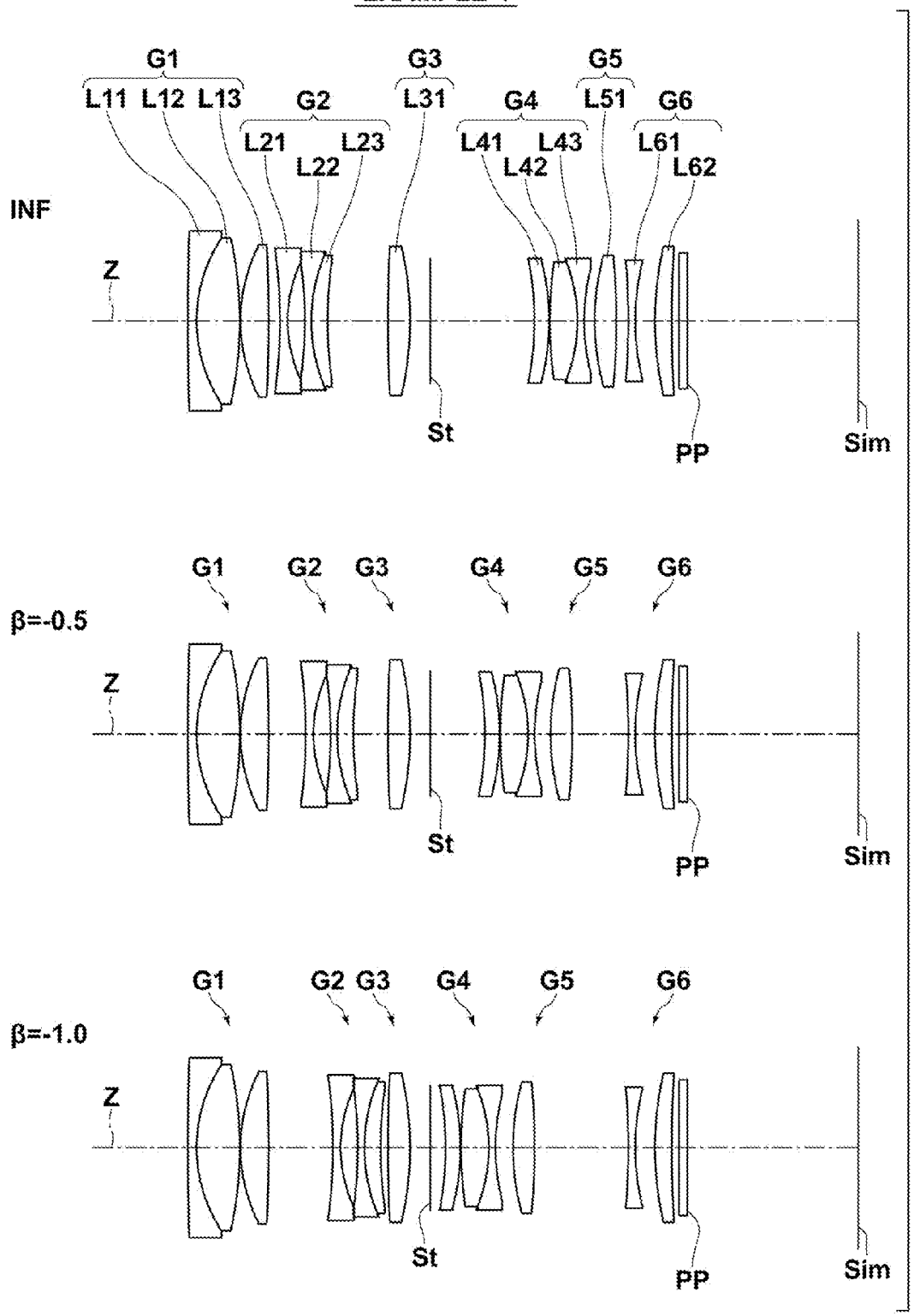
Figure 8:
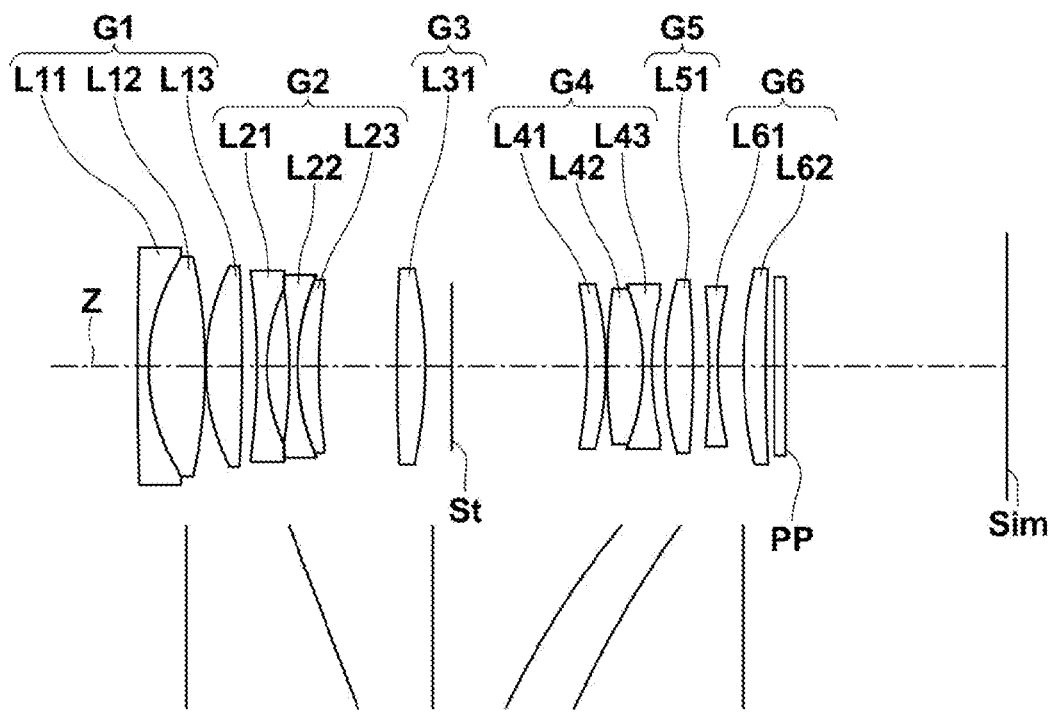
Figure 14:
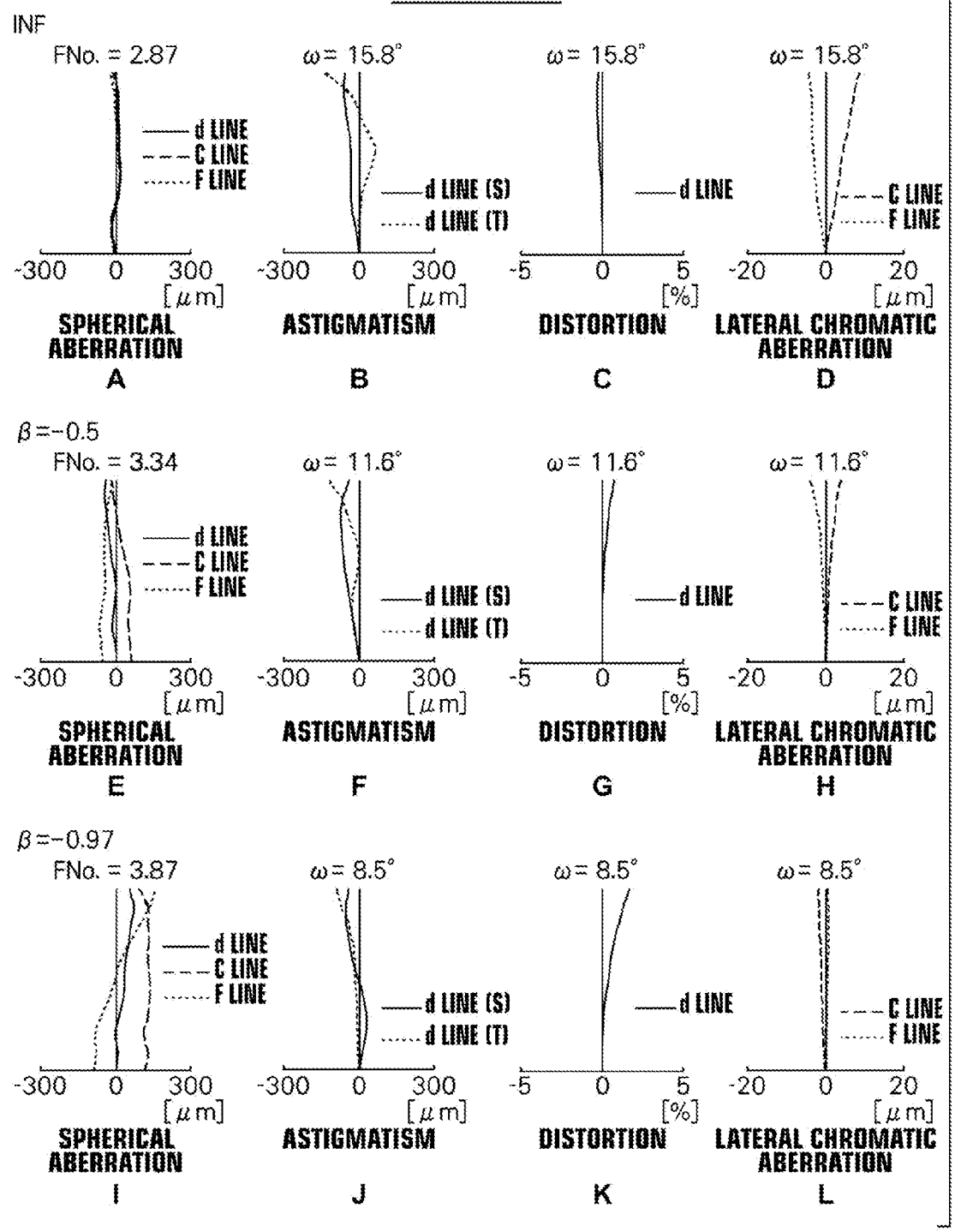

Next, a macro lens system of Example 4 will be described. FIG. 7 is a collection of sectional diagrams that illustrate the lens configuration of the macro lens system of Example 4, and FIG. 8 is a diagram that illustrates the movement trajectories of each lens group of the macro lens system of Example 4. Basic lens data of the macro lens system of Example 4 are shown in Table 13, data related to various factors are shown in Table 14, data related to distances among the moving surfaces are shown in Table 15, and data related to aspherical coefficients are shown in Table 16. A through L of FIG. 14 are diagrams that illustrate each type of aberration of the macro lens system of Example 4.

TABLE 13

Example 4: Lens Data

| Si (Surface Number) | Ri (Radius of Curvature) | Di (Distance) | Ndj (Refractive Index) | vdj (Abbe's Number) |
|---|---|---|---|---|
| 1 | 407.0539 | 1.26 | 1.84666 | 23.78 |
| 2 | 21.9999 | 6.14 | 1.59522 | 67.74 |
| 3 | −56.5029 | 0.10 | | |
| *4 | 23.9551 | 4.00 | 1.77250 | 49.47 |
| 5 | −233.9538 | DD[5] | | |
| 6 | −77.7000 | 1.10 | 1.83441 | 37.28 |
| *7 | 20.0000 | 2.44 | | |
| 8 | −64.1789 | 0.94 | 1.51742 | 52.43 |
| 9 | 25.1498 | 2.30 | 2.00272 | 19.32 |
| 10 | 61.7220 | DD[10] | | |
| 11 | 224.9631 | 3.15 | 2.00272 | 19.32 |
| 12 | −47.2617 | 2.87 | | |
| 13 (stop) | ∞ | DD[13] | | |
| 14 | −46.6689 | 2.10 | 2.00100 | 29.13 |
| 15 | −34.9986 | 0.10 | | |
| 16 | 62.1747 | 3.94 | 1.72916 | 54.68 |
| 17 | −23.4844 | 0.95 | 1.80809 | 22.76 |
| 18 | 31.2044 | DD[18] | | |
| 19 | 36.7378 | 3.07 | 2.00100 | 29.13 |
| 20 | −102.4158 | DD[20] | | |
| 21 | −105.5617 | 1.00 | 1.84666 | 23.78 |
| 22 | 36.7534 | 2.80 | | |
| 23 | 48.7900 | 2.40 | 1.51680 | 64.20 |
| 24 | 200.0000 | 1.00 | | |
| 25 | ∞ | 1.22 | 1.51680 | 64.20 |
| 26 | ∞ | 24.26 | | |

TABLE 14

Example 4: Items (related to the d line)

| | $\beta = 0$ | $\beta = -0.5$ | $\beta = -0.97$ |
|---|---|---|---|
| f | 51.51 | | |
| Bf | 26.07 | | |
| FNo. | 2.87 | 3.34 | 3.87 |
| 2ω[°] | 31.6 | 23.2 | 17.0 |

TABLE 15

Example 4: Distances Among Lens Groups

| | | | |
|---|---|---|---|
| DD[5] | 1.60 | 5.27 | 9.13 |
| DD[10] | 8.58 | 4.91 | 1.04 |
| DD[13] | 14.81 | 7.77 | 2.19 |
| DD[18] | 1.50 | 2.26 | 2.49 |
| DD[20] | 1.70 | 7.98 | 13.32 |

TABLE 16

Example 4: Aspherical Surface Coefficients

| Surface Number | 4 |
|---|---|
| KA | 2.4730542E+00 |
| A3 | −2.2999703E−05 |
| A4 | −1.7559895E−06 |
| A5 | −5.4519393E−06 |
| A6 | 8.2498736E−07 |
| A7 | −3.4850088E−08 |
| A8 | −5.4610562E−09 |
| A9 | 1.4387583E−10 |
| A10 | 4.7713075E−11 |

TABLE 16-continued

Example 4: Aspherical Surface Coefficients

| A11 | 2.8085693E−12 |
|---|---|
| A12 | −2.9992785E−13 |
| A13 | −6.3489108E−14 |
| A14 | −2.4604006E−16 |
| A15 | 8.9980507E−16 |
| A16 | −4.3024936E−17 |

| Surface Number | 7 |
|---|---|
| KA | −3.6681482E−01 |
| A3 | −3.6110268E−05 |
| A4 | 3.3043949E−05 |
| A5 | −4.6527128E−06 |
| A6 | 2.2954242E−07 |
| A7 | 5.1865808E−08 |
| A8 | −3.5539331E−09 |
| A9 | −7.0922502E−10 |
| A10 | 3.0550926E−11 |
| A11 | 9.1698822E−12 |
| A12 | −6.3291954E−13 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

Figure 9:
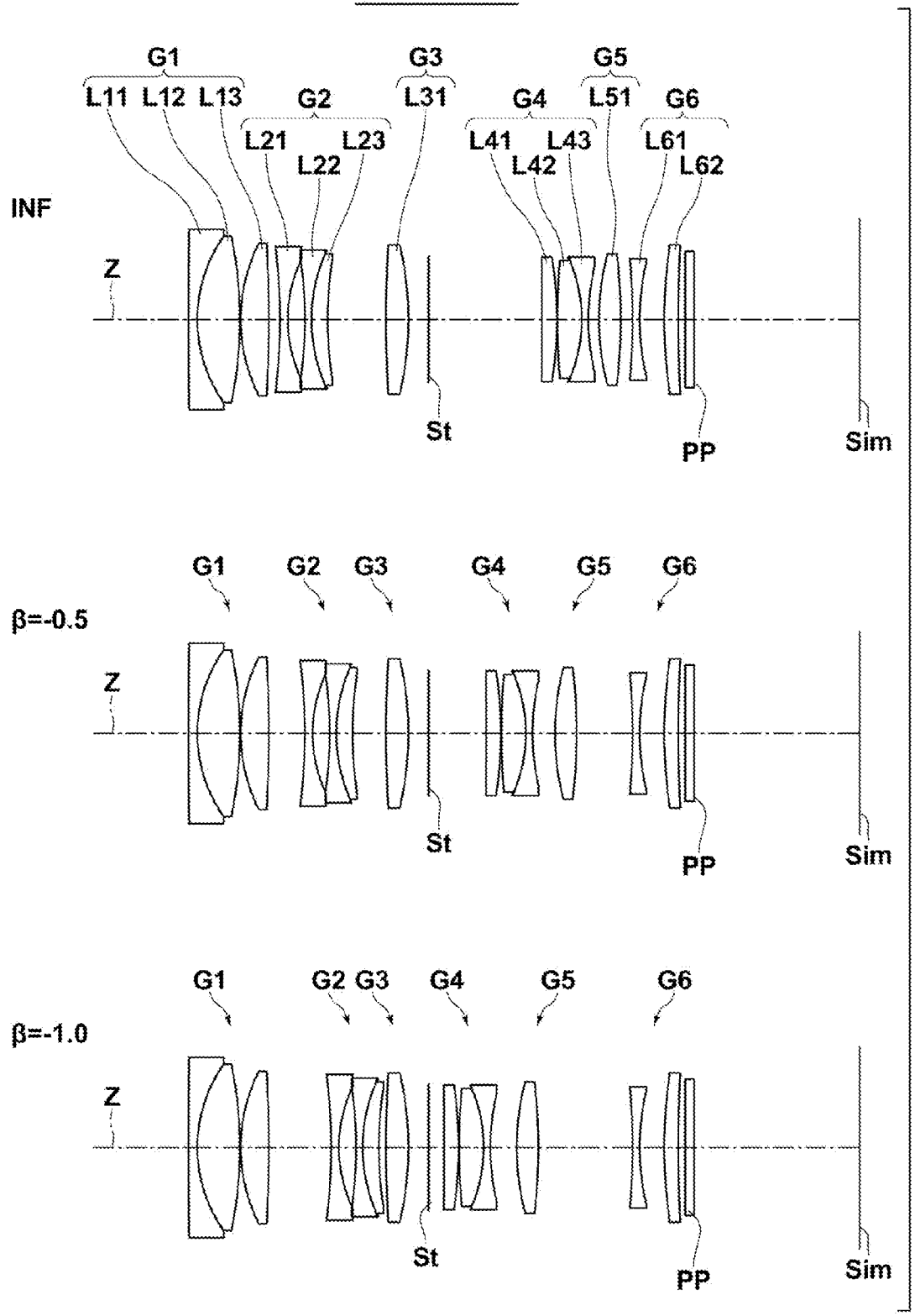
Figure 10:
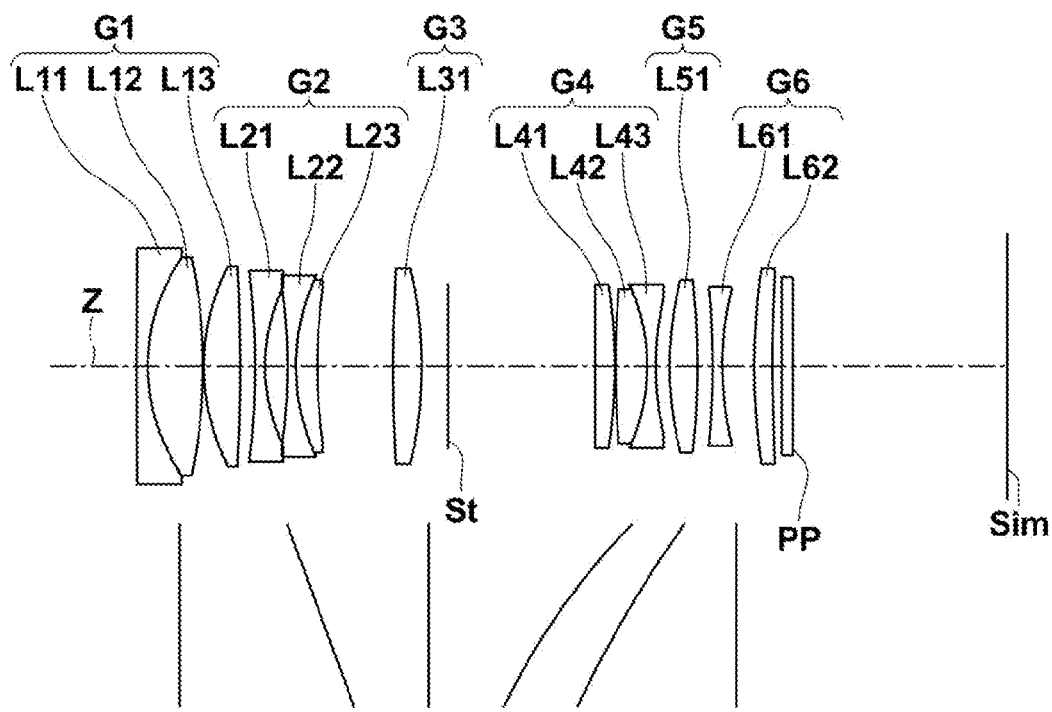
Figure 15:
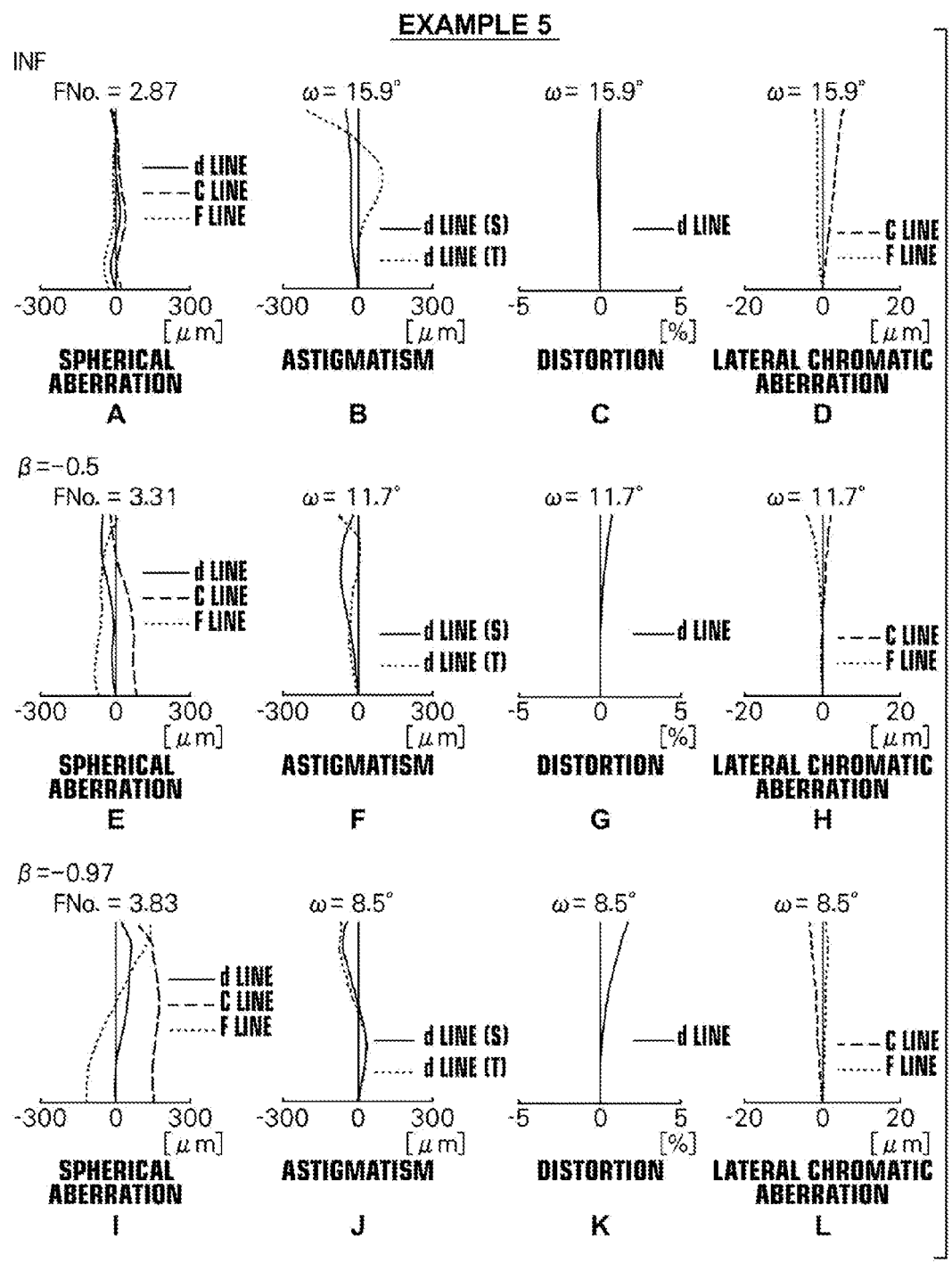

Next, a macro lens system of Example 5 will be described. FIG. 9 is a collection of sectional diagrams that illustrate the lens configuration of the macro lens system of Example 5, and FIG. 10 is a diagram that illustrates the movement trajectories of each lens group of the macro lens system of Example 5. Basic lens data of the macro lens system of Example 5 are shown in Table 17, data related to various factors are shown in Table 18, data related to distances among the moving surfaces are shown in Table 19, and data related to aspherical coefficients are shown in Table 20. A through L of FIG. 15 are diagrams that illustrate each type of aberration of the macro lens system of Example 5.

TABLE 17

Example 5: Lens Data

| Si (Surface Number) | Ri (Radius of Curvature) | Di (Distance) | Ndj (Refractive Index) | vdj (Abbe's Number) |
|---|---|---|---|---|
| 1 | 863.1374 | 1.26 | 1.84666 | 23.78 |
| 2 | 21.1333 | 6.04 | 1.60300 | 65.44 |
| 3 | −59.0877 | 0.10 | | |
| *4 | 24.0990 | 4.00 | 1.80139 | 45.45 |
| 5 | −202.0278 | DD[5] | | |
| 6 | −85.2550 | 1.10 | 1.80139 | 45.45 |
| *7 | 19.9998 | 2.44 | | |
| 8 | −61.0941 | 0.94 | 1.51742 | 52.43 |
| 9 | 23.9108 | 2.30 | 1.84666 | 23.78 |
| 10 | 57.0507 | DD[10] | | |
| 11 | 198.2152 | 3.15 | 2.00272 | 19.32 |
| 12 | −48.1489 | 2.87 | | |
| 13 (stop) | ∞ | DD[13] | | |
| 14 | −3208.8965 | 2.10 | 1.91082 | 35.25 |
| 15 | −60.5432 | 0.10 | | |
| 16 | 105.8085 | 3.46 | 1.77250 | 49.60 |
| 17 | −21.9424 | 0.95 | 1.84666 | 23.78 |
| 18 | 34.0720 | DD[18] | | |
| 19 | 38.0120 | 3.07 | 1.90366 | 31.32 |
| 20 | −81.7497 | DD[20] | | |
| 21 | −95.8790 | 1.00 | 1.80809 | 22.76 |
| 22 | 35.9067 | 3.50 | | |

TABLE 17-continued

Example 5: Lens Data

| Si (Surface Number) | Ri (Radius of Curvature) | Di (Distance) | Ndj (Refractive Index) | νdj (Abbe's Number) |
|---|---|---|---|---|
| 23 | 74.8444 | 2.00 | 1.88300 | 40.76 |
| 24 | 200.0037 | 1.00 | | |
| 25 | ∞ | 1.22 | 1.51680 | 64.20 |
| 26 | ∞ | 23.52 | | |

TABLE 18

Example 5: Items (related to the d line)

| | β = 0 | β = −0.5 | β = −0.97 |
|---|---|---|---|
| f | 51.12 | | |
| Bf | 25.32 | | |
| FNo. | 2.87 | 3.31 | 3.83 |
| 2ω[°] | 31.8 | 23.4 | 17.0 |

TABLE 19

Example 5: Distances Among Lens Groups

| DD[5] | 1.60 | 5.12 | 8.87 |
|---|---|---|---|
| DD[10] | 8.31 | 4.79 | 1.04 |
| DD[13] | 16.11 | 8.17 | 2.18 |
| DD[18] | 1.50 | 3.19 | 3.74 |
| DD[20] | 1.70 | 7.96 | 13.39 |

TABLE 20

Example 5: Aspherical Surface Coefficients

| Surface Number | 4 |
|---|---|
| KA | 4.1319383E−01 |
| A3 | −1.2447769E−05 |
| A4 | 5.5607953E−06 |
| A5 | −8.2298330E−07 |
| A6 | 5.1383807E−08 |
| A7 | 1.3805599E−09 |
| A8 | −2.3445326E−10 |
| A9 | −7.8513622E−12 |
| A10 | 9.1487665E−13 |
| A11 | 2.9058233E−14 |
| A12 | 2.6541350E−14 |
| A13 | −2.1048379E−15 |
| A14 | −2.7729364E−16 |
| A15 | 2.2689421E−17 |
| A16 | 7.5771641E−22 |

TABLE 20-continued

Example 5: Aspherical Surface Coefficients

| Surface Number | 7 |
|---|---|
| KA | 7.4760887E−01 |
| A3 | −3.0841177E−05 |
| A4 | 9.5268314E−06 |
| A5 | −2.3115475E−06 |
| A6 | −2.1010866E−08 |
| A7 | 1.5789565E−08 |
| A8 | 1.0621441E−09 |
| A9 | −5.0458397E−11 |
| A10 | −1.5442955E−11 |
| A11 | −1.3002081E−12 |
| A12 | 1.8740459E−13 |
| A13 | 0.0000000E+00 |
| A14 | 0.0000000E+00 |
| A15 | 0.0000000E+00 |
| A16 | 0.0000000E+00 |
| A17 | 0.0000000E+00 |
| A18 | 0.0000000E+00 |
| A19 | 0.0000000E+00 |
| A20 | 0.0000000E+00 |

The values of the macro lens systems of Examples 1 through 5 corresponding to conditional formulas (1) through (7) are shown in Table 21 below. Note that all of the Examples use the d line as a reference wavelength, and the values indicated in Table 21 are obtained at this reference wavelength.

TABLE 21

| | Formula Condition | Example 1 | Example 2 | Example 3 | Example 4 | Example 5 |
|---|---|---|---|---|---|---|
| (1) | N1d < 1.65 | 1.49700 | 1.49700 | 1.59522 | 1.59522 | 1.60300 |
| (2) | 60.0 < ν1d | 81.5 | 81.5 | 67.7 | 67.7 | 65.4 |
| (3) | 20.0 < ν2dn − ν2dp | 44.9 | 44.9 | 34.9 | 33.1 | 28.6 |
| (4) | N3d < 30.0 | 25.5 | 25.5 | 20.9 | 19.3 | 19.3 |
| (5) | 0.5 < f3/f < 1.5 | 0.728 | 0.722 | 0.916 | 0.761 | 0.761 |
| (6) | 0.5 < f45/f < 1.5 | 0.686 | 0.799 | 0.678 | 0.707 | 0.694 |
| (7) | 20 < ν4dp − ν4dn | 30.9 | 30.9 | 31.9 | 31.9 | 25.8 |

The above data indicates that all of the macro lens systems of Examples 1 through 5 satisfy Conditional Formulae (1) through (7). Therefore, it can be understood that the macro lens systems of the Examples are capable of favorably correcting chromatic aberrations even when imaging objects at close distances.

Figure 16A:
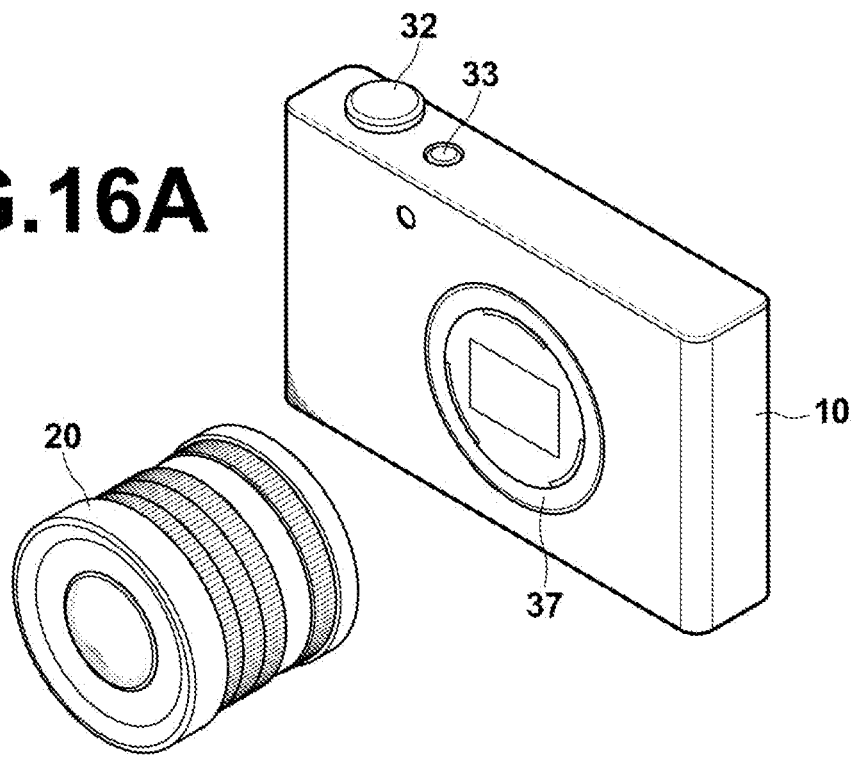
Figure 16B:
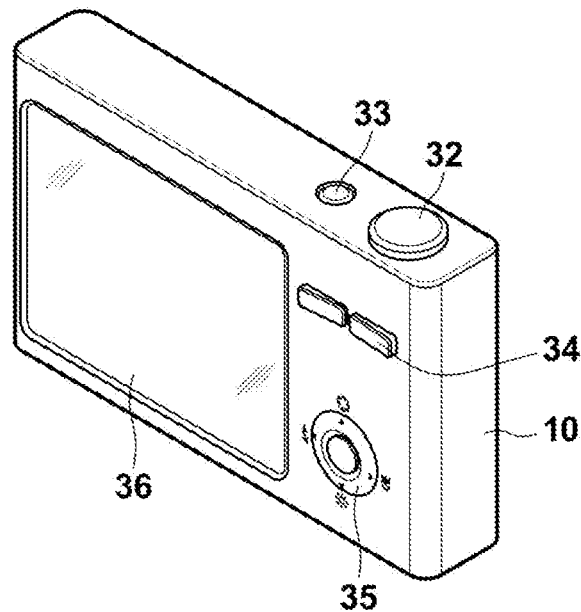

Next, an imaging apparatus according to an embodiment of the present invention will be described. FIGS. 16A and 16B are a collection of diagrams that illustrate the outer appearance of an example of a mirrorless interchangeable lens camera that employs the macro lens system according to the embodiment of the present invention, as an example of the imaging apparatus according to the embodiment of the present invention.

FIG. 16A illustrates the outer appearance of the camera as viewed from the front, and FIG. 16B illustrates the outer appearance of the camera as viewed from the back. The camera is equipped with a camera main body 10. A shutter release button 32 and a power button 33 are provided on the upper surface of the camera main body 10. A display section 36 and operating sections 34 and 35 are provided on the back surface of the camera main body 10. The display section 36 is for displaying obtained images.

An imaging aperture, into which light from imaging targets enters, is provided in the central portion of the front surface of the camera main body 10. A mount 37 is provided at a position corresponding to the imaging aperture. The mount 37 enables an interchangeable lens 20 to be mounted onto the camera main body 10. The interchangeable lens 20 is a lens barrel in which lens members are housed. An imaging element that outputs image signals corresponding to images of subjects formed by the interchangeable lens 20, such as a CCD, a signal processing circuit that processes the image signals output from the imaging element to generate images, a recording medium for storing the generated images, etc. are provided within the camera main body 10. In this camera, a pressing operation of the shutter release button 32 causes a photography operation of a single frame of a still image to be executed. Image data obtained by photography are stored in the recording medium (not shown) within the camera main body 10.

The camera can be miniaturized as a whole by employing the macro lens system of the present embodiment as the interchangeable lens 20 of the mirrorless interchangeable lens camera. At the same time, images having high image quality, in which chromatic aberrations are favorably corrected even during imaging at close distances, can be obtained.

The present invention has been described with reference to the embodiments and Examples. However, the present invention is not limited to the above embodiments and Examples, and various modifications are possible. For example, the numerical values of the radii of curvature, the surface distances, the refractive indices, the Abbe's numbers, etc. of the lens components are not limited to those exemplified in the above Examples, and may be different values.

What is claimed is:

1. A macro lens system, consisting of, in this order from an object side:
    a first lens group having a positive refractive power;
    a second lens group having a negative refractive power;
    a third lens group having a positive refractive power;
    a fourth lens group having a negative refractive power;
    a fifth lens group having a positive refractive power; and
    a sixth lens group having a negative refractive power;
    further comprising:
    a stop which is fixed during focusing operations provided between the surface of the second lens group toward the image side and the surface of the fourth lens group toward the object side; characterized by:
    the second lens group, the fourth lens group, and the fifth lens group being independently moved in the direction of the optical axes thereof when focusing from an object at infinity to an object at a most proximate distance; and
    the second lens group moving toward the image side and the fourth lens group moving toward the object side when focusing from an object at infinity to an object at a most proximate distance, wherein:
    the fourth lens group has a cemented lens formed by a negative lens and a positive lens, with the positive lens being at the side closest to the object side, and satisfies Conditional Formula (7) below:

$$20.0 < v4dp - v4dn \tag{7}$$

wherein v4dp denotes the Abbe's number of the positive lens that forms the cemented lens of the fourth lens group with respect to the d line, and v4dn denotes the Abbe's number of the negative lens that forms the cemented lens of the fourth lens group with respect to the d line.

2. A macro lens system as defined in claim 1, wherein:
the first lens group has at least one positive lens; and
at least one positive lens satisfies Conditional Formulae (1) and (2) below:

$$N1d < 1.65 \tag{1}$$

$$60.0 < v1d \tag{2}$$

wherein N1d denotes the refractive index of the positive lens in the first lens group with respect to the d line, and v1d denotes the Abbe's number of the positive lens in the first lens group with respect to the d line.

3. A macro lens system as defined in claim 1, wherein:
the second lens group has a cemented lens formed by a negative lens and a positive lens, and satisfies Conditional Formula (3) below:

$$20.0 < v2dn - \mu 2dp \tag{3}$$

wherein v2dp denotes the Abbe's number of the positive lens that forms the cemented lens of the second lens group with respect to the d line, and v2dn denotes the Abbe's number of the negative lens that forms the cemented lens of the second lens group with respect to the d line.

4. A macro lens system as defined in claim 1, wherein:
the third lens group consists essentially of a single positive lens, and satisfies Conditional Formula (4) below:

$$v3d < 30.0 \tag{4}$$

wherein v3d denotes the Abbe's number with respect to the d line of the positive lens of the third lens group.

5. A macro lens system as defined in claim 1, wherein:
the macro lens system satisfies Conditional Formula (5) below:

$$0.5 < f3/f < 1.5 \tag{5}$$

wherein f denotes the focal length of the macro lens system when focused on an object at infinity, and f3 denotes the focal length of the third lens group.

6. A macro lens system as defined in claim 1, wherein:
the macro lens system satisfies Conditional Formula (6) below:

$$0.5 < f45/f < 1.5 \tag{6}$$

wherein f45 denotes the combined focal length of the fourth lens group and the fifth lens group when focused on infinity.

7. A macro lens system as defined in claim 1, wherein:
at least one surface within the first lens group is an aspherical surface.

8. A macro lens system as defined in claim 1, wherein:
at least one surface within the second lens group is an aspherical surface.

9. A macro lens system as defined in claim 1, wherein:
the total number of lenses that constitute the lens groups that move during focusing operations is 7 or less.

10. A macro lens as defined in claim 1, wherein:
the first lens group consists essentially of three lenses.

11. A macro lens system as defined in claim 1, wherein:
the first lens group has at least one positive lens; and
at least one positive lens satisfies Conditional Formulae (1) and (2-1) below:

$$N1d < 1.65 \tag{1}$$

$$65.0 < v1d \tag{2-1}$$

wherein N1d denotes the refractive index of the positive lens in the first lens group with respect to the d line, and v1d denotes the Abbe's number of the positive lens in the first lens group with respect to the d line.

12. A macro lens system as defined in claim 1, wherein:
the second lens group has a cemented lens formed by a negative lens and a positive lens, and satisfies Conditional Formula (3-1) below:

$$25.0 < v2dn - v2dp \tag{3-1}$$

wherein v2dp denotes the Abbe's number of the positive lens that forms the cemented lens of the second lens group with respect to the d line, and v2dn denotes the Abbe's number of the negative lens that forms the cemented lens of the second lens group with respect to the d line.

13. A macro lens system as defined in claim 1, wherein:
the third lens group consists essentially of a single positive lens, and satisfies Conditional Formula (4-1) below:

$$v3d < 26.0 \tag{4-1}$$

wherein v3d denotes the Abbe's number of the positive lens of the third lens group with respect to the d line.

14. A macro lens system as defined in claim 1, wherein:
the macro lens system satisfies Conditional Formula (5-1) below:

$$0.6 < f3/f < 1.2 \tag{5-1}$$

wherein f denotes the focal length of the macro lens system when focused on an object at infinity, and f3 denotes the focal length of the third lens group.

15. A macro lens system as defined in claim 1, wherein:
the macro lens system satisfies Conditional Formula (5-2) below:

$$0.65 < f3/f < 1.0 \tag{5-2}$$

wherein f denotes the focal length of the macro lens system when focused on an object at infinity, and f3 denotes the focal length of the third lens group.

16. A macro lens system as defined in claim 1, wherein:
the macro lens system satisfies Conditional Formula (6-1) below:

$$0.6 < f45/f < 1.0 \tag{6-1}$$

wherein f45 denotes the combined focal length of the fourth lens group and the fifth lens group when focused on infinity.

17. A macro lens as defined in claim 1, wherein:
the fourth lens group has a cemented lens formed by a negative lens and a positive lens, with the positive lens being at the side closest to the object side, and satisfies Conditional Formula (7-1) below:

$$25.0 < v4dp - v4dn \tag{7-1}$$

wherein v4dp denotes the Abbe's number of the positive lens that forms the cemented lens of the fourth lens group with respect to the d line, and v4dn denotes the Abbe's number of the negative lens that forms the cemented lens of the fourth lens group with respect to the d line.

18. An imaging apparatus, comprising:
an apparatus body; and
the macro lens system defined in claim 1 mounted to the apparatus body.

* * * * *